United States Patent
Cavallaro et al.

(10) Patent No.: US 6,864,886 B1
(45) Date of Patent: Mar. 8, 2005

(54) ENHANCING VIDEO USING A VIRTUAL SURFACE

(75) Inventors: Richard H. Cavallaro, Mountain View, CA (US); James R. Gloudemans, San Mateo, CA (US); Matthew T. Lazar, Redwood City, CA (US); Kevin R. Meier, Redwood City, CA (US); Alon Mozes, Redwood City, CA (US); Roberto J. Peon, Mountain View, CA (US); Eric M. Steinberg, San Rafael, CA (US)

(73) Assignee: SportVision, Inc., New York, NY (US)

( * ) Notice: Subject to any disclaimer, the term of this patent is extended or adjusted under 35 U.S.C. 154(b) by 227 days.

(21) Appl. No.: 09/928,165

(22) Filed: Aug. 10, 2001

Related U.S. Application Data

(60) Provisional application No. 60/224,504, filed on Aug. 10, 2000.

(51) Int. Cl.[7] .............................................. G06T 15/00
(52) U.S. Cl. ....................................................... 345/420
(58) Field of Search ................................. 345/418, 419, 345/426, 427, 428, 619, 629

(56) References Cited

U.S. PATENT DOCUMENTS

| 3,617,630 | A | * | 11/1971 | Reiffel ......................... 348/707 |
| 5,459,529 | A | * | 10/1995 | Searby et al. ............... 348/586 |
| 6,057,833 | A | * | 5/2000 | Heidmann et al. .......... 345/726 |
| 6,496,196 | B2 | * | 12/2002 | Shiga .......................... 345/629 |

* cited by examiner

Primary Examiner—Phu K. Nguyen
(74) Attorney, Agent, or Firm—Vierra Magen Marcus Harmon & DeNiro LLP

(57) ABSTRACT

A system is disclosed for enhancing video by use of a virtual surface. One or more positions are identified in a first image. These one or more positions are transformed to one or more locations in relation to the virtual surface. In subsequent video images (e.g. fields, frames, or other units), the one or more locations in relation to said virtual surface are transformed to one or more positions in the subsequent video images. The subsequent video images are enhanced based on the one or more transformed positions.

58 Claims, 12 Drawing Sheets

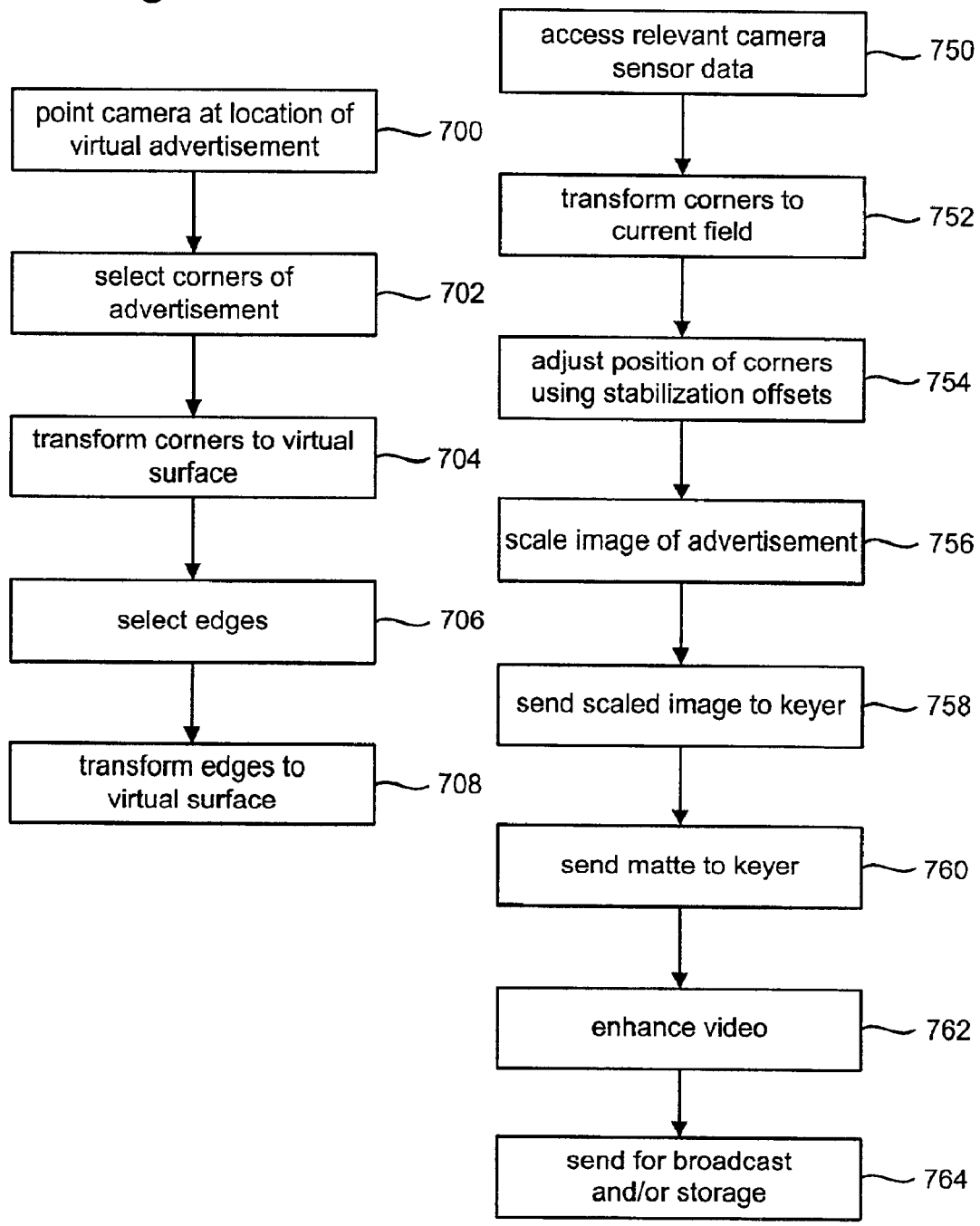

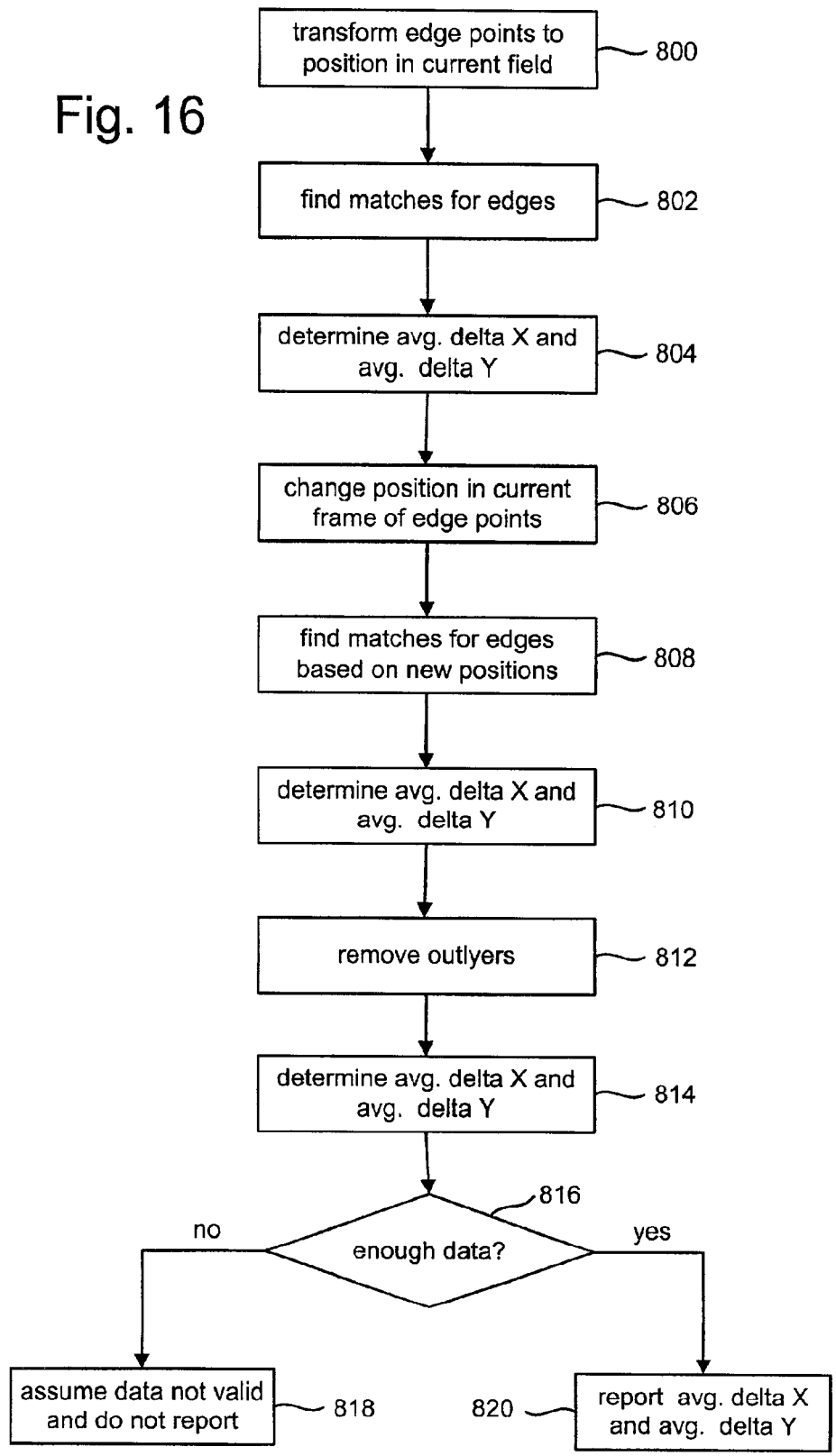

ENHANCING VIDEO USING A VIRTUAL SURFACE

This application claims benefit of U.S. Provisional Application No. 60/224,504, "Telestrator System Using Virtual Surface," filed on Aug. 10, 2000, incorporated herein by reference.

CROSS REFERENCE

This application is related to the following application, which is incorporated herein by reference:

"Telestrator System," Ser. No. 09/425,992, filed Oct. 21, 1999.

BACKGROUND OF THE INVENTION

1. Field of the Invention

The present invention is directed to technology for enhancing video.

2. Description of the Related Art

The remarkable, often astonishing, physical skills and feats of great athletes draw millions of people every day to follow sports. In particular, the amount of people watching sports on television and the amount of advertising revenue received for televised sports has increased significantly. To satisfy the increased demand for televised sports, broadcasters have deployed a varied repertoire of technologies to highlight to viewers these exciting events. For example, broadcasters have started adding graphical enhancements to the video of the sporting events. Examples of graphic enhancements have included highlighting moving objects, highlighting portions of a playing field, adding virtual advertisements and adding of other graphics to the video of the event.

Many of the systems that add graphic enhancements to video use camera sensors. Examples of a camera sensor include sensors that measure the pan, tilt, zoom, etc. of a camera. In order to use these sensors, some systems must first survey the environment being captured in the video and the location of each camera. By knowing where the object to be highlighted is in the environment, where the camera is in relation to the environment and where the camera is pointing to, the system can determine where to edit the video. While these prior systems have worked very well, the process of surveying the environment and the camera location can be expensive and time consuming. Furthermore, there are instances where it is impossible or impractical to survey the environment being captured in the video. For example, for television coverage of a downhill ski race, it would not be practical to survey an entire mountain at the level of detail necessary for a video enhancement system.

Therefore, a system is needed that avoids the requirement for surveying the environment being captured in the video and the location of each camera.

SUMMARY OF THE INVENTION

The present invention, roughly described, pertains to a system for enhancing video by use of a virtual surface. One or more positions are identified in a first image. These one or more positions are transformed to one or more locations in relation to a virtual surface. In subsequent video images (e.g. fields, frames, or other units), the one or more locations in relation to the virtual surface are transformed to one or more positions in the subsequent video images. The subsequent video images are enhanced based on the one or more transformed positions.

The use of a virtual surface allows for the system to be successfully operated without surveying the environment being captured in the video and the location of each camera. This is because the operator chooses a virtual surface (e.g. a sphere, plane, etc) and chooses where that surface lies in a coordinate system having an origin at a position with a known relation to the camera.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, pc boards, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 14 is a flow chart describing a set-up procedure for the second embodiment.

FIG. 15 is a flow chart describing the operation of the second embodiment of the present invention.

FIG. 16 is a flow chart describing the process for determining stabilization offsets.

DETAILED DESCRIPTION

Figure 1:
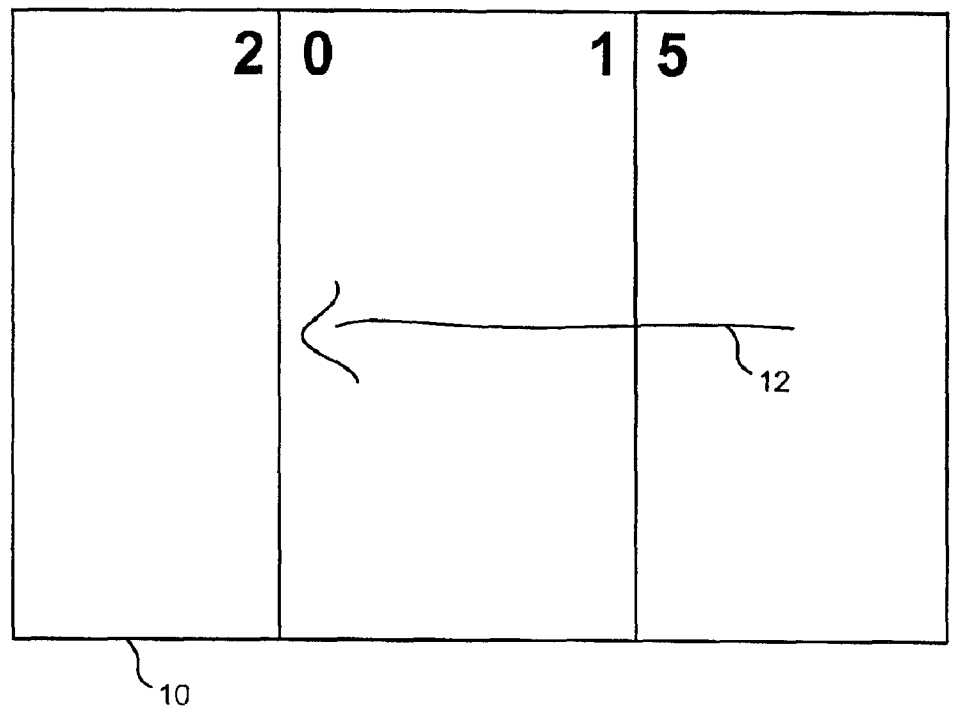
FIGS. 1 and 2 show video images that result from the use of prior art telestrator systems.

The present invention can be used to enhance a video representation of an event. For purposes of explanation only, the examples discussed in this present application pertain to the broadcast of sporting events. However, the present invention applies equally to non-sporting events. Additionally, the present invention can be used to enhance live video, stored video or still images. One exemplar enhancement is the blending of one or more graphics with the video. A graphic includes drawings or illustrations, highlights, logos, shapes, etc. Examples of drawings include curves, shapes, text and anything that can be drawn by hand or otherwise. A curve includes curved lines and straight lines. Video means an analog or digital signal depicting (or used to produce) a set of still or moving images. Blending means combining at least a first image or video with at least a second image of video such that the result includes all or part of that first image or video and all or part of the second image or video. One example of how images are blended includes using a keyer.

The present invention can be used to add many types of enhancements to video. Some examples include graphically annotating (telestrating) a video, adding virtual advertisements to video, highlighting various images, adding new images, etc. Examples of highlighting images in a video include highlighting an image of a hockey puck, ball, player, etc. Examples of adding images includes adding a virtual first down line to a video of an American football game, adding an offsides line to a video of a soccer/football game, virtual product placements, etc. An example of annotating video is a telestrator system, which allows an operator to draw (e.g. lines, circles or other shapes, or symbols) on live or stored video.

One embodiment of the present invention includes a system that allows a user of the system to draw (or annotate) on the video such that the drawing appears to be drawn directly on the surface of the scene being depicted in the video. For example, during an American football game, if a user draws on the video it appears that the user is actually drawing on the playing field. After the user draws the illustration, the drawing will appear to be painted on the playing field so that if the camera moves the drawing still appears on the playing field at approximately the same position and in approximately the same perspective. This feature is explained by FIG. 14.

Figure 2:
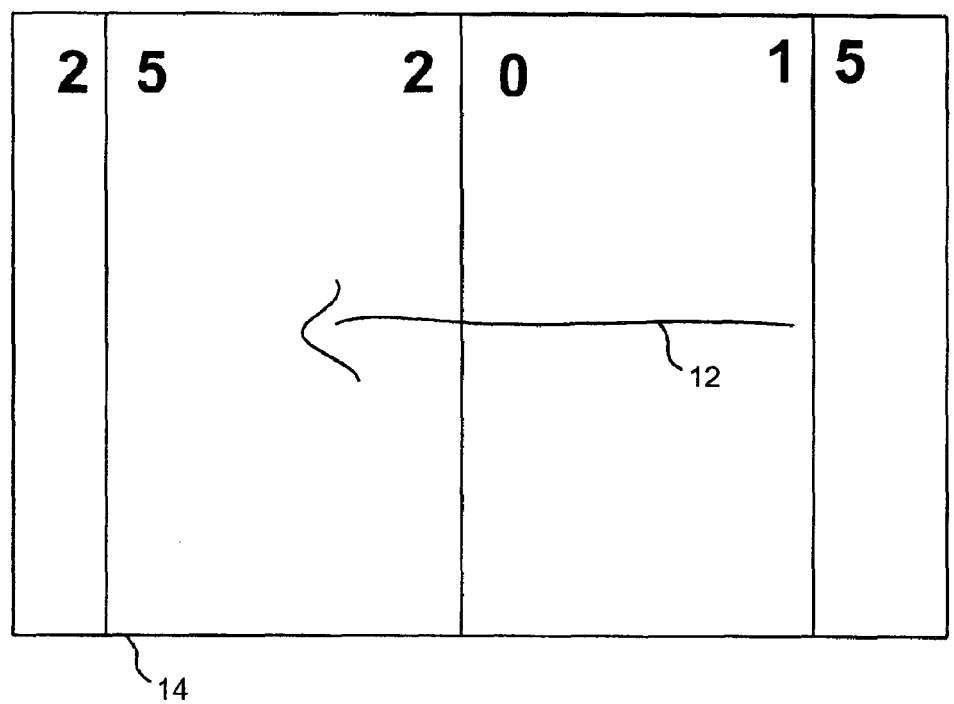

For example, FIG. 1 depicts a frame of video 10. Frame 10 shows a portion of an American football field including the 15 yard line and the 20 yard line. In this example, the operator of the prior art telestrator system has drawn an arrow 12 to indicate where a player was running, direction of movement, etc. If the camera providing the video were to pan so that the camera points to a different portion of the football field, the portion of the football field in the video would change but the position of arrow 12 in the frame would not. For example, FIG. 2 shows a second frame 14 from the prior art telestrator system. Frame 14 differs from frame 10 because the camera has panned to show the 25 yard line. Although the location of the portions of the field have moved between frame 10 and frame 14, the position of arrow 12 remains in the exact same position relative to the camera frame. If the operator originally was drawing arrow 12 to show the path a player ran on the field, when frame 14 is depicted arrow 12 will no longer show the actual path. That is, in frame 10 arrow 12 shows a path across the 15 yard line stopping just before the 20 yard line. On the other hand, in frame 14 arrow 12 shows a path not crossing the 15 yard line, but rather crossing the 20 yard line. Thus, arrow 12 is no longer an accurate representation of what the operator intended to draw.

Figure 3:
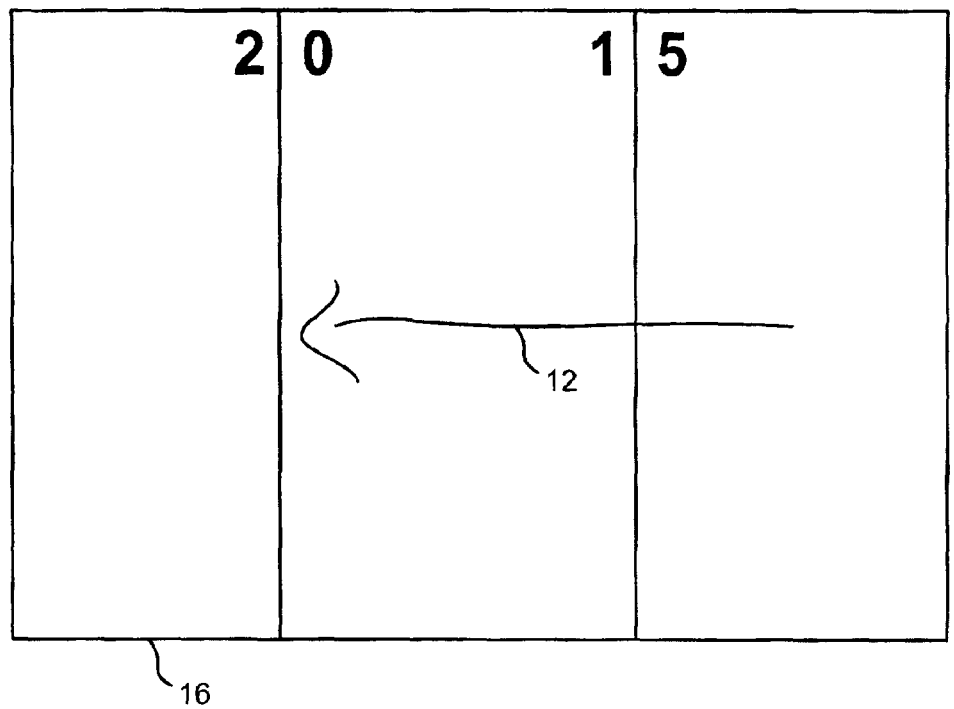
FIGS. 3 and 4 depict video images that result from using a telestrator system with the present invention.
Figure 4:
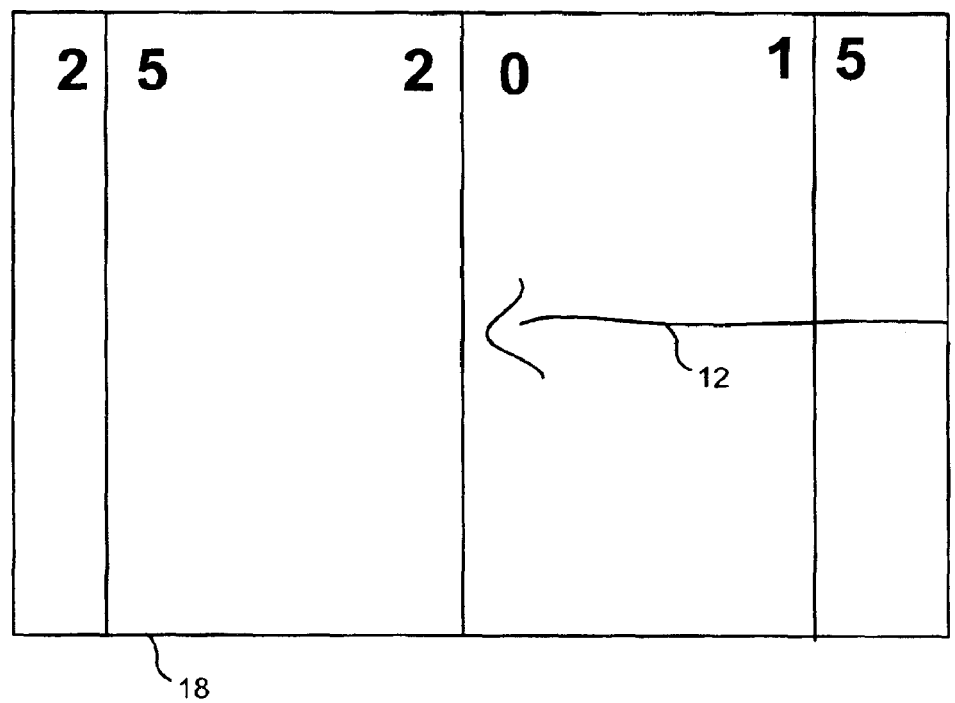

FIG. 3 shows a video frame 16 which is broadcast as a result of using a telestrator system according to the present invention. The operator had drawn an arrow 12 to show the path of a player or object on the playing field. FIG. 4 shows a video frame 18 which is also the result of using the present invention. However, FIG. 4 shows arrow 12 at a different position in frame 18 than in frame 16. That is because after the operator had drawn arrow 12 and it was depicted in frame 16, the camera panned down the playing field. Instead of being pointed between the 20 and 15 yard lines, the camera is now pointed directly at the 20 yard line and, thus, the 25 yard line is now visible. Because the field moved within the camera's field of view, the location of arrow 12 also moved within the camera's field of view. Arrow 12 now appears to be drawn directly on the playing field as opposed to on the television monitor. As the field moves on the video screen, arrow 12 will also move. The present invention can achieve a similar effect (e.g. appearing to be painted on the filed or other location) with a virtual advertisement, highlight, logo, etc.

In some embodiments, the blending of a graphic into a video must take into account occlusions. That is, if a player steps on top of or in front of the area where the graphic is, the graphic should not be drawn over the player. The player should appear to be stepping on or standing in front of the graphic. Similarly, there may be portions of the surface or field which should not be drawn over by the graphic. For example, the broadcaster may decide that the announcer's drawing should not appear to obscure certain objects (such as a football) or markings on the field (e.g. the numbers painted on the field). In addition to keying/not keying based on color, there may be portions of the scene that will not be annotated regardless of color. These portions of the scene may be mapped to portions of the virtual surface and handled appropriately. Conversely, there may be areas that should be enhanced regardless of whether they are occluded, based on color keying.

Figure 5:
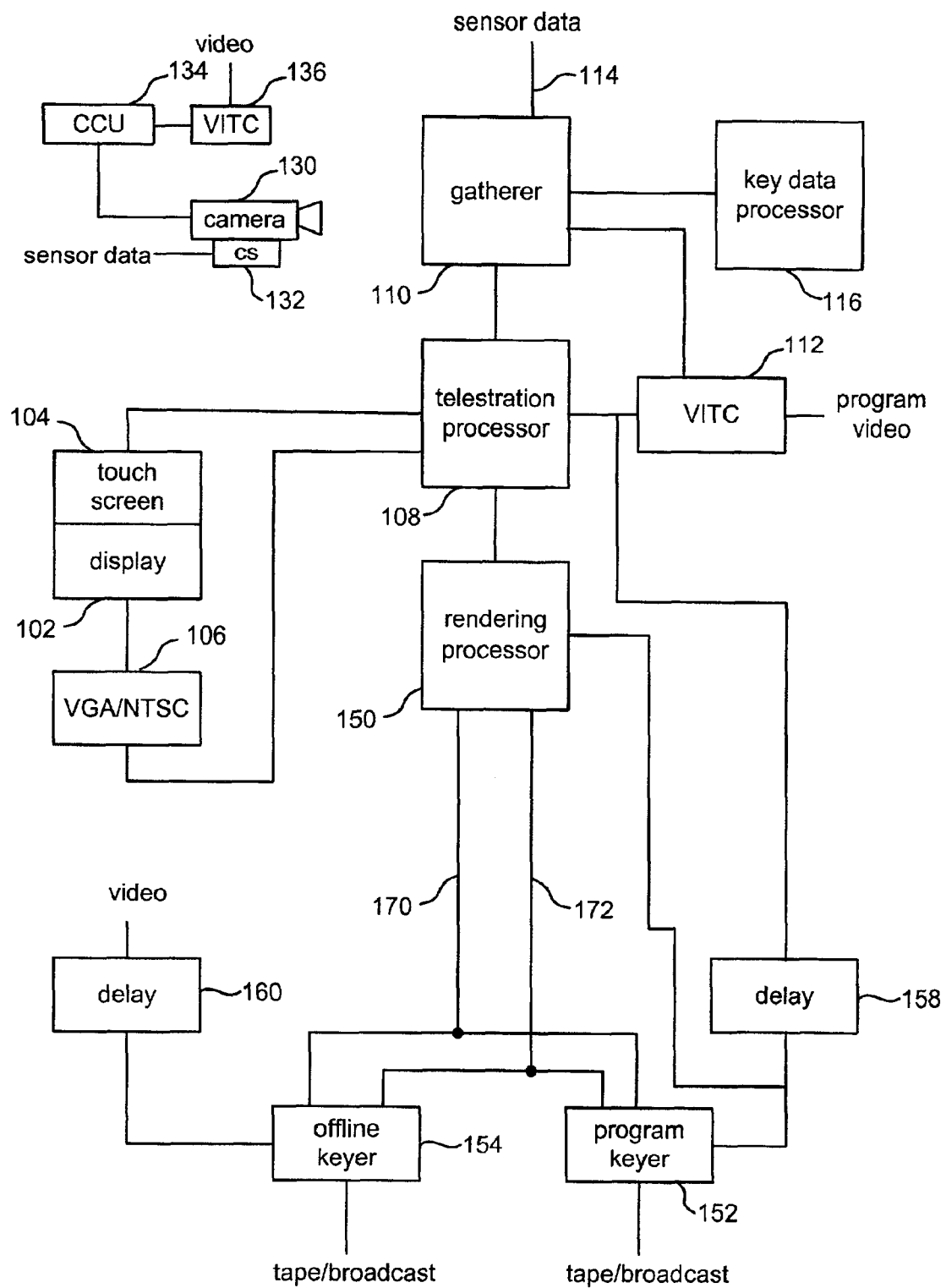
FIG. 5 is a block diagram of one exemplar set of hardware used to implement one embodiment of the present invention.

FIG. 5 is a block diagram of the hardware components that comprise one embodiment of the present invention. The user interface for the operator of the present invention includes a display 102 and touch screen 104 mounted on display 102. In one embodiment, the display is a flat panel display and the touch screen is manufactured by Elo TouchSystems, Inc. (www.elotouch.com). The output of touch screen 104 is sent to telestration processor 108. In one embodiment, telestration processor 108 sends a video signal to video format converter 106. The output of video format converter 106 is communicated to display 102. In one embodiment, video format converter 106 converts the video signal of telestration processor 108 from VGA format to NTSC format. In other embodiments, there may not be a need for converter 106. In operation, a user of the system can use a finger (or a tool) on touch screen 104 to draw a graphic (e.g. shape or curve). Information about what is being drawn is sent to telestration processor 108. The resulting blend of the drawing with the video is sent back to display 102. In another embodiment, display 102 would receive the actual broadcast.

Telestration processor 108 also receives the program video from VITC inserter 112. At a given event, a broadcaster typically uses multiple cameras. The producer or director of the event will typically choose one camera for broadcast at any given instant. The program video is the video from the camera chosen for broadcast. The program video is sent to VITC (Vertical Interval Time Code) inserter 112, which sends the video to telestration processor 108 and delay 158. VITC inserter 112 sends a RS-232 time stamp signal to gatherer 110. Telestration processor 108 may also receive video from other sources (e.g. replay decks, other cameras, etc.) for offline work. Telestration processor 108 also receives data from gatherer 110. In one embodiment, gatherer 110 is a computer. In another embodiment, gatherer 110 can be dedicated hardware. Gatherer 110 receives time code information from VITC inserter 112, camera sensor data from the various instrumented cameras (line 114), and key data from a key data processor 116.

Each of the cameras used with the present invention includes a number of camera sensors that measure data (camera sensor data) to determine the field of view of the camera. FIG. 5 shows an example of camera 130 with camera sensors 132. The camera sensors measure attitude and state of the camera, and could include any or all of the following: optical shaft encoders, fiber optic gyros, inclinometers, and reading voltages from the lens (e.g. 2xExtender, focus, zoom). Other camera sensors can also be used.

In one embodiment, camera 130 is part of a camera assembly that includes a tripod base, a camera head interface (also called a tripod head interface) mounted on the tripod base, a camera head (also called a tripod head) mounted on the camera head interface, a camera mounted on the camera head, and a lens mounted on the camera. The tripod base is the standard tripod known in the art (e.g., a Mathews MT1). The camera head can be a standard camera head known in the art, for example, a Vector 70 from Vinten, Inc. The Vector 70 allows the camera to tilt and pan. To measure tilt and pan, optical shaft encoders can be attached at the pan axis and tilt axis to measure the rotation of the camera about the pan axis and tilt axis. An example of an optical shaft encoder is the CP-850 Series from Computer Optical Products, 9305 Eton Avenue, Chatsworth, Calif. 91311. The pan shaft encoder is mounted in the camera head interface.

One or more inclinometers can be mounted on the camera head interface to measure attitude of the stationary portion of the camera assembly. Thus, if the camera assembly is on an angle, is kicked, or otherwise changes, that change in attitude will be detected (and measured). One example of a suitable inclinometer uses liquid between a pair of plates, and measures change of capacitance. Another example is an electrolyte varying the conductance between two conductors. In one embodiment, a suitable inclinometer indicates an absolute angle. In one alternative, the inclinometer can indicate angles up to +/−1°, +/−1.5° or +/−6°. Other suitable ranges can also be used. An example of a suitable inclinometer is the Ceramic Tilt Sensor SH50054 from Spectron, 595 Old Willets Path, Hauppaug, N.Y. 11788, (516) 582-5600. Other suitable inclinometers can also be used with the present invention. In one embodiment, the system will include two inclinometers. A first inclinometer would be mounted on a first surface of the camera head interface. A second inclinometer would be mounted on a second surface of the camera head interface. The first surface is ideally orthogonal to the second surface. Both inclinometers would be connected to an electronics board for receiving the data and packaging it with data from the other sensors. The electronics board is part of the camera head interface.

One or more gyros can be mounted on the camera lens to measure high frequency vibrations, low frequency vibrations and mechanical compliance between the moving portion of the camera assembly and the stationary portion of the camera assembly. In one embodiment, the system includes two gyros mounted on a block. The block itself is mounted on the lens of the camera. The first gyro is mounted on a first surface of the block and the second gyro is mounted on the second surface of the block. The first surface is ideally orthogonal to the second surface. In an alternative embodiment, the two gyros can be mounted on the tripod or the camera head interface. While the encoders discussed above measure angles relative to a fixed base, the rate gyro measures absolute angular rate information that is not relative to any part of the camera assembly. In one embodiment, the gyros are fiber optic gyros. An example of a suitable fiber optic gyro is the E-Core 2000 Series Fiber Optic Gyro manufactured and sold by KVH Industries, Inc., 50 Enterprise Center, Middleton Road, R.I. 02842. Other gyros that could also be used include a ring laser, mechanical gyro, tuning fork, spinning disk gyro, semiconductor gyro, etc. Integrating the output of the gyro will produce an angle delta indicating that the gyro was rotated by a certain angle. The fiber optic gyro discussed above measures angular rate about a single axis. However, multi-axis gyros can also be used. In one embodiment, the system can use three or more gyros instead of two in order to measure pitch, roll and yaw. In one implementation, gyros alone could be used to sense camera attitude. Other alternatives include using angular gyros.

In one embodiment, each camera sensor unit 132 includes electronics in the camera head interface for receiving signals from the pan encoder, tilt encoder, two gyros, two inclinometers, 2xExtender, lens focus and lens zoom. This data is sent to a processor which packages the data, synchronizes the data and encodes the data on the audio channel by modulating an audio carrier in order to send the data in the camera's microphone (or audio) channel to the television production studio. More information about using camera sensors can be found in U.S. Pat. No. 5,912,700; U.S. Pat. No. 6,266,100; and U.S. patent application Ser. No. 09/472,635, titled "Measuring Camera Attitude," filed on Dec. 27, 1999; all three of which are incorporated herein by reference.

Data from camera sensors 132 is sent to gatherer 110. In the embodiment that includes sending the camera sensor data to the production center from the camera location via the camera's audio channel, the production center includes hardware to demodulate the audio channel and send the camera sensor data to gatherer 110. In some instances, the production studio is in a truck at the event. More information about sending the camera sensor data on the audio channel can be found in U.S. patent application Ser. No. 09/472,635, incorporated herein by reference.

The video from camera 130 is sent to camera control unit 134, which controls various video and optical parameters for camera 130. The output of camera control unit 134 is sent to VITC inserter 136 which adds a time code and unique camera identifier into the vertical blanking interval of the video from camera 130. In one embodiment, the time code and camera identifier are added to lines 21 and 22, the first two visible lines. The present invention can be operated using one or more instrumented cameras. Each instrumented camera would have its own CCU and its own VITC inserter. Each camera's VITC inserter is synchronized with VITC 112. In alternative embodiments, the present invention can be used with fixed, non-instrumented cameras. In another alternative, the present invention can be used with non-instrumented cameras that are not fixed, in combination with image recognition.

In addition to receiving the camera sensor data for each instrumented camera and the video from VITC 112, Gatherer 110 also receives information from key data processor 116. In one embodiment, key data processor 116, telestration processor 108 and rendering processor 150 are O2 workstations from Silicon Graphics. Gatherer 110 is PC. Other computers can also be used. Key data processor 116 is used to provide information on which colors are included and excluded from being blended with the enhancements (e.g. virtual advertisements, annotations, etc.). Gatherer 110 packages the key data, the sensor data and the time code into sets of information and sends that information to telestration processor 108. Gatherer 110 can package other types of data as well. In other embodiments, key data processor sends the key data directly to telestration processor 108. Telestration processor 108 determines how the graphics drawn on touch screen 104 should be blended with the program video and sends that information to rendering processor 150. Rendering processor 150 takes charge of the actual blending of the graphics with the program video.

To perform the blending, rendering processor 150 supplies two signals 170 and 172 to program keyer 152 and off-line keyer 154. Signal 170 is called alpha and signal 172 is called foreground. Program keyer also receives an input from video delay 158. Video delay 158 receives the program video from VITC 112, delays it for a number of fields and transmits the delayed video to program keyer 152 and rendering processor 150. The delayed video sent to program keyer 152 is called background. Based on the value of alpha signal 170 from rendering processor 150, program keyer 152 determines how much foreground and background to blend on a pixel by pixel basis. Program keyer 152 can blend from 100% foreground and 0% background to 0% foreground and 100% background. In one embodiment, the alpha for a particular pixel can range from 0% to 100% (or 0–1 or another similar range as per the specification of the keyer). The output of program keyer 152 can be sent for broadcast, recording or both. During typical operation described below, the output of program keyer 152 is live video.

Alpha 170 and foreground 172 are also sent to off-line keyer 154. The background signal received by off-line keyer 154 is from video delay 160. In one embodiment, the delayed video from video delay 160 is from a video storage device such as a tape player or other suitable storage device. In another embodiment, the video input to delay 160 is from a camera. In one alternative, the video input to delay 160 is also sent to telestration processor 108. The output of offline keyer can be used to produce replays, half time shows or highlights.

The system can also include a kill switch which can be used by an operator to enable or disable the keying of the graphic. Additionally, a watch dog timer can be included to automatically disable the keying of the graphic if rendering processor 150 stops sending a periodic signal.

Figure 6:
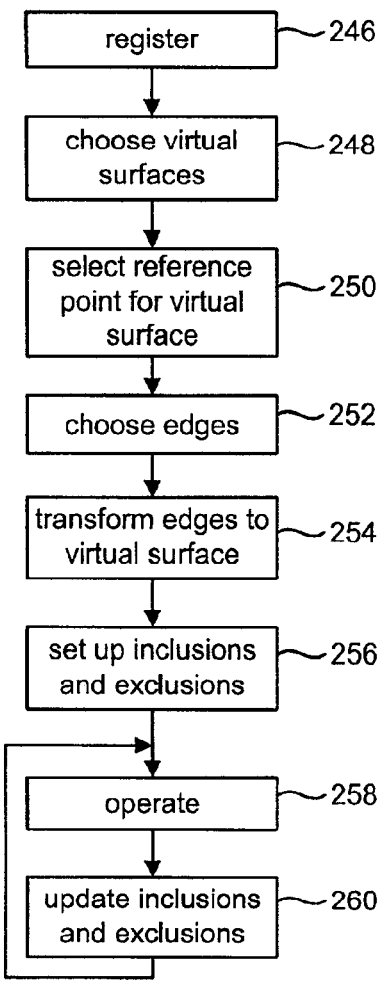
FIG. 6 is a flow chart describing one embodiment of the operation of the system of FIG. 5.

FIG. 6 describes one embodiment of the operation of the system of FIG. 5. In step 246, the system is registered. Registration, a technology known by those skilled in the art, is the process of defining how to interpret data from a sensor and/or to ascertain data variables for operation of the system. The sensors described above output data, for example, related to position and orientation. Since position and orientation are relative, the system needs a reference from which to determine position or orientation. Thus, in order to be able to use camera sensor data, the system needs to know how to interpret the data to make use of the information. In one embodiment, registration includes pointing the instrumented cameras at known locations and solving for unknown variables used in transformation matrices. As explained below, the present invention uses a virtual surface rather than an actual surface; therefore, the registration process is greatly reduced. The virtual surface is not an attempt to approximate a real surface. Rather, it is a surface that does not exist in the real world. For example, there is no need to measure the three dimensional position of the camera in relation to the surface because the virtual surface is created to be at a desired position with respect to the camera.

In one embodiment, registration includes resetting the encoders for all of the pan and tilt sensors, which involves moving the cameras through the range of motion to pass the zero count index reference point for each of the encoders. The optical center (or optical axis) is found for each camera and each extender setting. To do so, the camera's cursor (e.g. cross hair) is positioned in the center of the camera's viewfinder and the camera is zoomed in to the tightest zoom. The camera is positioned (panned and tilted) so that the cursor is centered on a fixed location. At that point, the camera is zoomed out to the widest zoom. If the cursor is still centered on the fixed location, the cursor is located on the optical axis. If the cursor is not centered on the fixed location, (while the camera is still zoomed out) the cursor is moved, without moving the camera, so that the cursor is now centered on the fixed location in the viewfinder. The camera is then zoomed in to the tightest zoom. If the cursor is still centered on the fixed location, then the cursor is located on the optical axis. Otherwise, the camera is moved such that the cursor is centered on the fixed location. This process will continue until the cursor remains on the fixed location while the camera is zoomed in and out. This process will be repeated both for the 1×setting and the 2×setting of the 2×Extender. Some lenses also have a 1.5×setting.

Registration also includes finding level tilt for the cameras. Level tilt is the valve measured by the camera's tilt encoder when the optical axis is perpendicular to the force of gravity. Level tilt is found by setting a laser plane next to the camera at the level of the camera's lens. A stick or other object that can be used to view the marking from the laser plane should be placed across the stadium at a height to receive the beam. By pointing the optical center of the camera on the point illuminated on the stick by the laser plane across the stadium, the camera is brought to level tilt. A receiver can also be used that has audio and visible indicators to help locate the beam. A sticker is then placed at the level position for the camera to spot. The tilt registration parameter, which is referred to below in the math as tiltLevel, is the encoder reading in degrees (or radians) at level tilt. Prior to determining level tilt, a digital level is placed on the camera and the camera is panned to ensure that the pan axis is vertical. If it is not, suitable adjustments are made. In an alternative, a pan axis that is not vertical can be modeled (rather than corrected). In another embodiment, one or more inclinometers can be connected to the base of the pan and tilt heads, in order to more accurately measure and, perhaps, model the attitude of the pan axis. This allows for toleration of shifts in camera attitude. Radio frequencies sometimes cause noise in the pan and tilt sensors. To compensate, the zero count mark is moved so that it is in the typical center of the camera's view so that an absolute reset is established frequently.

A zoom lens map is created. The zoom lens is opened to its widest angle and its output voltage and field of view are recorded. The zoom lens is zoomed to the tightest zoom and its output voltage and field of view are recorded. The voltage and field of view are also recorded at ten intermediate positions. In one embodiment, the zoom sensor includes adding a wire to read an output voltage from a zoom lens. Alternatively, a zoom lens can output a digital signal that describes the state of the zoom lens. The system interpolates for other values.

Additionally, a twist parameter is determined for each camera. A camera is pointed to the field (or other portion of an environment) and the output of the camera is sent to a computer with a monitor. The image from the camera is displayed on the computer as the camera pans. A slider on a graphical user interface (GUI) is used to alter the twist of the camera image so that it is properly aligned. The degree of alignment correction is recorded as the twist registration parameter.

In step 248 of FIG. 6, one or more virtual surfaces are chosen. Each instrumented camera will have its own set of one or more virtual surfaces. The virtual surface is a surface that does not exist in the real environment being captured in the video. Examples of virtual surfaces include a sphere, a plane, a box, a cylinder, or any other appropriate shape. If the virtual surface is a plane, the registration process described above may (in one embodiment) determine the camera position and orientation with respect to the virtual plane. In one embodiment, the system uses one virtual surface, and all of the enhancements are made using the one virtual surface. In another embodiment, the system uses multiple virtual surfaces, with a different virtual surface being used for each different enhancement. In yet another embodiment, the system uses multiple virtual surfaces, with a different virtual surface being used for different portions of the environment being captured on video.

In one example, a system can have one virtual surface for annotating video, a second virtual surface for a first virtual advertisement and a third virtual surface for a second virtual advertisement. Thus, each camera of this example system has three virtual surfaces.

In one embodiment, there is a separate three dimensional coordinate system associated with each camera. The virtual surfaces for a particular camera are represented in the three dimensional coordinate system for that camera. Step 250 of FIG. 6 includes selecting a reference point in the three dimensional coordinate system for a camera for the virtual surface. In one embodiment, the origin of the three dimensional coordinate system for a camera is where the optical axis for a camera intersects the pan axis for that camera, the virtual surface is a sphere, and the center of the sphere is at the origin of the three dimensional coordinate system. The radius of the sphere (or other shape) is selected so that the virtual surface is close to the portion of the environment that is likely to be enhanced. For example, the surface of the sphere could be in proximity to the location of the virtual advertisement or the portion of the field (or other location) that is to be annotated. Alternatively, the center of the sphere and/or the origin of the coordinate system can also be located at the point where the pan axis intersects the tilt axis, the front nodal point of the camera or another point that is a function of any of the points discussed above.

In one option, the sphere does not move during operation. In another option, the center of the sphere moves with the camera's front nodal point. In alternative embodiments, the sphere can be very small or the camera is positioned outside the sphere (or other shape). If the sphere is not to be translated to coincide with the front nodal point it should be centered as nearly as possible to a point that stays fixed along the camera's zoom axis as the camera is panned and tilted or along the optical axis as a function of tilt. While there may be no such ideal point, there will typically be a small region in space that the cameras zoom axis always passes through (or near) regardless of pan/tilt. In this case, the sphere may be centered in that space to optimize the appearance of the effect over the realm of pan and tilt expected. In one embodiment with a fixed sphere, it is optimal to use a sphere whose radius is similar to the distance between the camera and field (or object to be telestrated).

In step 252 of FIG. 6, the operator of the system selects a set of edges for use in the stabilization process described below. In step 254, the selected edges are transformed to the appropriate virtual surface. If the stabilization process is not used, steps 252 and 254 can be skipped. More details about choosing edges and transforming the edges will be described below.

In step 256, the operator sets up inclusions and exclusions. In one embodiment of the present invention, the graphic can be added to the video without taking into account the contents of the video signal. There will be no accounting for occlusions (e.g. a player or object in front of the surface on which the enhancement is intended to appear). In another embodiment, the present invention can include inclusions and/or exclusions in order to account for occlusions and other object or markings. An inclusion is a color range for a pixel that can be enhanced using the present invention. An exclusion is a color range for a pixel that should not be enhanced using the present invention. During operation, the operator can set up one or more inclusions and/or one or more exclusions. For example, the operator may decide that a graphic can be drawn over green (grass) and brown (dirt). Additionally, the operator may want to set up the exclusion so that a line is not drawn over a specific color (e.g. team's uniforms). It is possible to allow drawing over one shade of green (grass) and not allow drawing over a second shade of green (team's shirt color). In an alternate embodiment of the present invention, exclusions can also include video frame pixel positions or three dimensional locations that are not to be enhanced. The process of setting up inclusions and exclusions is performed using key data processor 116.

When operating the system of FIG. 5, step 256 of FIG. 6 includes sending an output from a camera to key data processor 116. The camera will be panned and tilted to point to the different areas of the field or stadium. The operator can view the output of the camera on a monitor and, using a pointing device (e.g. a mouse), select areas for inclusion (create an inclusion filter) or exclusion (create an exclusion filter). For example, the operator could use a mouse to circle a section of grass in the shade, grass in direct sunlight, dirt, player uniforms, shoes, balls, etc.

When setting up inclusions and exclusions, key data processor 116 first receives a set of pixels. In one embodiment of the present invention, the pixel set received is from the output of one of the cameras. For example, a pixel set can include selected pixels from an image of the playing field, selected pixels from an image of one of the teams' uniforms, or other images. In another embodiment, the pixel set can be received from a stored image.

Once the pixel set is received, the operator of key data processor 116 determines whether the pixel set is to be used for identifying exclusion pixels or identifying inclusion pixels. If it is determined that the pixel set has been received for establishing criteria for exclusion pixels, then key data processor 116 generates an exclusion filter. If it is determined that the pixel set has been received to establish criteria for inclusion pixels, then key data processor 116 generates an inclusion filter. Multiple inclusion filters and exclusion filters can be generated.

In one embodiment of the present invention, key data processor 116 generates inclusion filters and exclusion filters by generating a set of histograms characterizing the received sets of pixels. For example, an inclusion filter may include a Y histogram, a Cr histogram and a Cb histogram, all of which describe the inclusion filter in YCbCr format. The Y characteristic histogram has a horizontal axis representing luminance values and a vertical axis representing the number of pixels in the received pixel set that corresponds to each of the luminance values. The Cr characteristic histogram has a horizontal axis representing Cr values and a vertical axis representing the number of pixels in the received pixel set that corresponds to each of the Cr values. The Cb characteristic histogram has a horizontal axis representing Cb values and a vertical axis representing the number of pixels in the received pixel set that corresponds to each of the Cb values. Each histogram has a respective pass band that defines the Y, Cr, or Cb characteristics that a pixel must have to be an inclusion pixel. Accordingly, a pixel will be designated as an inclusion pixel when the filter is applied and the pixel has a Y characteristic value within the Y pass band, a Cr characteristic value within the Cr pass band, and a Cb characteristic value within the Cb pass band. Exclusion filters work in a similar manner.

Figure 7:
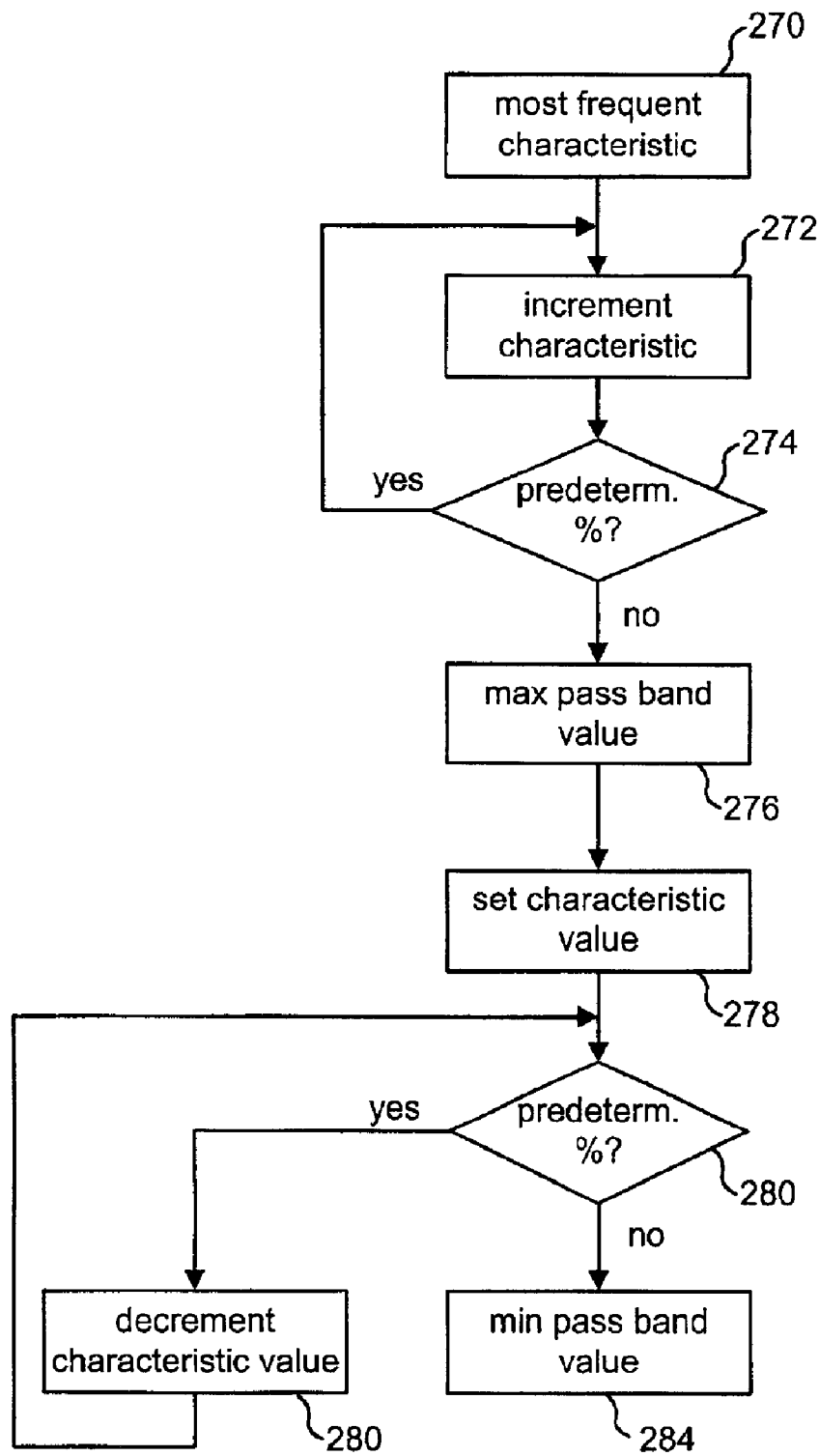
FIG. 7 is a flow chart describing the process of setting a filter pass band.

FIG. 7 illustrates a sequence of operations performed by key data processor 116 to determine a pass band for an inclusion filter histogram or an exclusion filter histogram. In the embodiment using YCbCr, the steps of FIG. 7 are performed for each of the three histograms. First, key data processor 116 identifies the most frequently occurring value for the characteristic (Y, Cr, or Cb) represented by the histogram in step 270. Next, the characteristic value is incremented in step 272. It is then determined whether the number of pixels having the resulting characteristic value is within a predetermined percentage of the number of pixels having the most frequently occurring characteristic value in step 274. In one embodiment of the present invention, the predetermined percentage employed in step 274 is 10 percent for an inclusion filter and 50 percent for an exclusion filter.

If it is determined that the number of pixels with the characteristic value is above the predetermined percentage, then the characteristic value is incremented in step 272 and a new comparison is performed. If it is determined that the number of pixels with the characteristic value is not above the predetermined percentage, then the maximum characteristic value for the pass band is set in step 276 to be equal to the last characteristic value with a number of pixels above the predetermined percentage.

Once the maximum pass band characteristic value is set, the characteristic value is set to be equal to the characteristic value just below the most frequently occurring characteristic value in step 278. It is then determined whether the number of pixels having the resulting characteristic value is above a predetermined percentage of the number of pixels having the most frequently occurring characteristic value in step 280. In one embodiment of the present invention, the predetermined percentage employed in step 280 is one percent for an inclusion filter and twenty five percent for an exclusion filter. In another embodiment of the present invention, the predetermined percentage employed in step 280 is 10 percent for an inclusion filter and 50 percent for an exclusion filter.

If it is determined that the number of pixels with the characteristic value is above the predetermined percentage, then the characteristic value is decreased in step 280 and a new comparison is performed. If it is determined that the number of pixels with the characteristic value is not above the predetermined percentage, then the minimum characteristic value for the pass band is set in step 284 to equal the last characteristic value with a number of pixels above the predetermined percentage of the number of pixels representing the most frequently occurring characteristic value.

Although the generation of an inclusion filter and exclusion filter has been described with respect to forming a histogram, one of ordinary skill in the art will recognize that it is not necessary to actually form a graphical image of a histogram. A processor could also maintain a table of data that reflects the Y, Cr, and Cb data. It will also be recognized that percentage thresholds identified above are not the only percentages that may be employed. Any number of percentages may be employed, depending upon the resolution that is desirable for the filter. One with ordinary skill in the art will further recognize that other methods can be employed for generating inclusion filters and exclusion filters. For example, a color region or set of color regions can be selected for inclusion or exclusion using a chromaticity diagram. More information on how to set up and use inclusions and exclusions is provided in U.S. patent application Ser. No. 09/160,534, filed Sep. 24, 1998, incorporated herein by reference.

After the inclusion/exclusion filters are created, a color map is created. The color map is a database with a record for each possible color based on Y, Cr and Cb values. In an alternative embodiment, less than all of the possible colors are represented in the color map. For each color in the color map, the database stores an alpha percentage. The stored alpha percentage could be a number between zero and one hundred, zero and one, or another suitable range. Although the term percentage is used, the stored number need not be a number designating a fraction of one or a fraction of one hundred. The stored number need only designate an amount of blending. In one embodiment the stored alpha percentage is a number between 0 and 255. In one embodiment, when the operator selects a pixel set for an inclusion or an exclusion, the operator is asked to provide a percentage between zero and one hundred percent. The number provided by the operator is converted to a scale of 0–255. The converted number is stored as the alpha percentage for each color described by the inclusion/exclusion filter (e.g. each color within the pass bands of the filter).

Additionally, a taper zone is set up. The taper zone includes colors outside of but near the pass bands for a filter. One method for determining the colors in the taper zone is to create an additional set of pass bands (in addition to the inclusion pass bands) in the same manner as described above, but use different percentages so that the pass bands are wider. Those colors in the new pass bands but not in the inclusion pass bands are in the taper zone. The colors in the taper zone closest to the inclusion pass bands are given an alpha percentage equal to or slightly lower than the alpha percentage given to the colors in the inclusion/exclusion pass bands. The colors in the taper zone farthest from the inclusion pass bands are given an alpha percentage equal to no blending. The colors in between are given an alpha percentage based on linear interpolation. An analogous method is used for taper zones near exclusions. The alpha percentages for each color in the taper zones are stored in the color map.

After step 256 of FIG. 6, the present invention is operated in step 258 according to the methods described below. FIG. 6 also shows step 260 which includes updating the exclusions and inclusions using key data processor 116. During an event, lighting conditions, field conditions and weather conditions may change causing the colors to be included and excluded to change. In that case, the inclusions and exclusions could be updated in step 260. Note that FIG. 6 shows step 260 being performed after step 258. However, steps 258 and 260 are actually performed concurrently or otherwise overlapped in time. In one embodiment or appropriate situations where there are no significant changes in conditions, step 260 would be optional.

Figure 8:
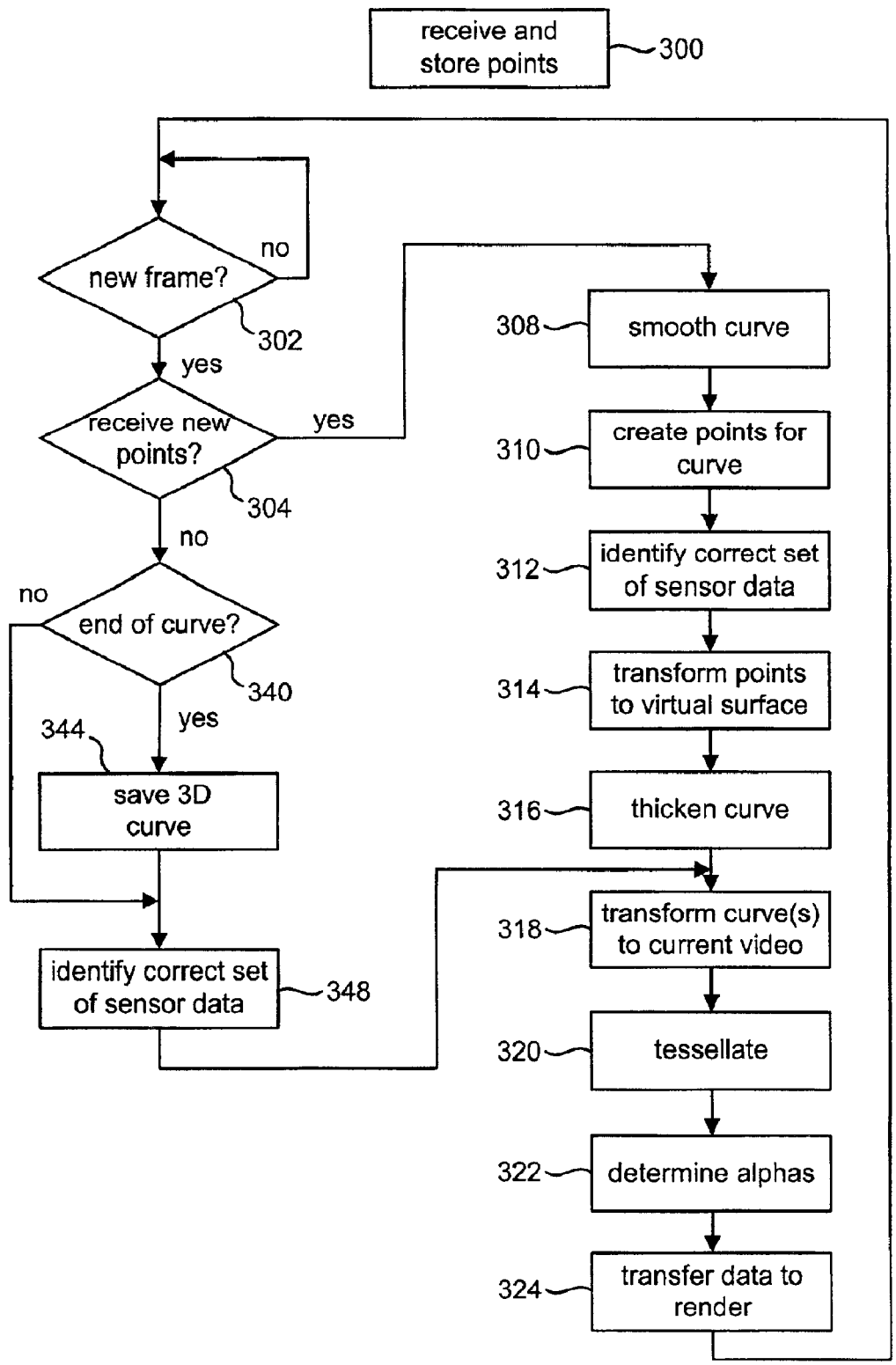
FIG. 8 is a flow chart describing a portion of the operation of one embodiment of the present invention.

FIG. 8 describes the operations performed by telestration processor 108. Step 300 includes receiving and storing pixel coordinates from touch screen 104. As the user touches touch screen 104 with the user's finger (or a light pen or other suitable device), touch screen 104 outputs the coordinates of the pixel touched and sends the coordinates to telestration processor 108. As the user continues to move the user's finger, more points are sent to telestration processor 108. As telestration processor 108 receives those points, they are stored in memory, a hard disk or another storage medium. Step 300 is not depicted as being connected to any other steps because it is a process that is constantly being performed during the operation of the system.

Based on the received program video, telestration processor 108 waits for a new frame to start in step 302. Alternatively, step 302 could include waiting for a new field to start. When a frame starts, in step 304, telestration processor 108 determines whether it has received any new points from touch screen 104 since the last frame. If it has received new points, then in step 308, telestration processor 108 smoothes the curve represented by the points received from touch screen 104. That is, the operator may have drawn a line or curve that is filled with jagged edges that are not very pleasing to the eye. Step 308 includes smoothing that curve or line to a more pleasing shape. In step 310, telestration processor 108 creates a set of points to represent the smoothed curve. More details of how a curve is smoothed is described by the flow chart of FIG. 9. The steps of FIG. 9 include setting a number of control points. Step 310 includes dividing up the curve between each control point into eight (or more) segments. The end points of each segment are the points created in step 310. In step 312, telestration processor 108 identifies the correct set of sensor data. Remember that gatherer 110 receives data from all of the camera sensors and packages the data into sets of data, which are sent to telestration processor 108. Also remember that the VITC inserters (e.g. VITC inserter 136) add a unique identifier to the signal from each camera. Thus, telestration processor 108 looks at the vertical blanking interval of the program video it is receiving and identifies the camera by the unique camera identifier. Gatherer 110 had added a camera identifier to the sensor data for each of the individual cameras. Telestration processor 108 will match the camera identifier and time code from the program video to the camera identifier and time code of the appropriate camera sensor data. Thus, telestration processor 108 will use the camera sensor data from the camera providing the program video.

In one embodiment, the sensor data used to transform the graphics may be recently recorded or may be previously recorded (e.g. fifteen minutes previously, hours previously, etc.). For example, video captured earlier is stored with its camera identifier and times codes. The stored camera identifier and times codes can be used to identify the appropriate stored camera sensor data. In this way, the invention can operate on stored video and stored sensor data after the event has taken place.

In step 314, the points identified in step 310 are transformed from the two dimensional coordinate system of the video to three dimensional locations on the appropriate virtual surface. In one embodiment, the points identified in step 310 are transformed to the three dimensional coordinate system of the virtual surface, but not all of the points will lie on the virtual surface—some will be on the virtual surface and others will be off the virtual surface but mathematically described with respect to (or connected to) the virtual surface. Various means for converting points between coordinate systems are known in the art. One example of doing such a transformation is to use transformation matrices. The use of transformation matrices to convert between coordinate systems is well documented in the art. One of ordinary skill in the art would know how to insert the data from the camera sensors identified in step 312 into a set of transformation matrices and use those matrices. Examples of the use of transformation matrices can be found in U.S. Pat. No. 5,862,517, U.S. Pat. No. 5,912,700 and U.S. Pat. No. 6,229,550, all of which are incorporated herein by reference. Step 314 includes transforming all of the points created in step 310. These transformed points are added to previously transformed points/images (if any) in the three dimensional space of the virtual surface.

A two dimensional point consisting of pixel coordinates in a field (or frame) of video is transformed to a three dimensional location on the virtual surface using two steps. In the first step, the pixel coordinates are transformed using a set of transformation matrices to a point opnt on the near clipping plane and a point inpnt on the far clipping plane. A unit vector U that passes through opnt and inpnt is determined:

$$U = inpt - opnt$$

where:

u.x=x coordinate of vector U;

u.y=y coordinate of vector U; and u.z=z coordinate of vector U.

The location LOC on the virtual surface that corresponds to the pixel coordinates in the video field is the location on the virtual surface that is intersected by the vector U. Thus:

$$LOC = opnt + U \cdot t,$$

Where t is the parametric value to determine how far along the vector U the location LOC is from opnt on the near plane. The value of t is determined as follows:

$$t = \frac{\left(-B + \sqrt{B^2 - 4AC}\right)}{2A}$$

where:

$A = u.x^2 + u.y^2 + u.z^2$;

$B = 2(opnt \cdot U)$; (note, this is a dot product)

$C = OPNT^2 - R^2$; and

R=radius of sphere (virtual surface).

The above analysis requires knowledge of the three dimensional coordinates of opnt and inpnt. The coordinates of opnt are represented as $(x_1', y_1', z_1', 1)$ and are determined based on the coordinates $(x_p, y_p)$ in the field of video. First, the position $(x_s, y_s)$ of the pixel in the viewing frustum is determined:

$$(x_s, y_s) = \left(\frac{x_p - CurrOptCenterX}{HalfScreenWidth}, \frac{y_p - CurrOptCenterY}{halfScreenHeight}\right)$$

where:

halfScreenWidth is half of the number of horizontal pixels in one row of one image (default is 320);

halfScreenHeight is half of the number vertical pixels in one column of one image (the default is 240);

CurrOptCenterX is the horizontal optical center offset plus halfScreenWidth;

CurrOptCenterY is the vertical optical center offset plus halfScreenHeight;

ScreenWidth $\geq x_p \geq 0$;

ScreenHeight $\geq y_p \geq 0$;

$1 \geq x_s \geq -1$; and $1 \geq y_s \geq -1$.

Since we are determining a point in the near clipping plane, let $z_s=1$ and $w=n$, where n is the near clipping plane distance. In one embodiment, n is set at one yard. Let $(x_1,y_1,z_1,w_1)=(x_s\cdot w, y_s\cdot w, z_s\cdot w, w)$. Then compute $(x_1', y_1', z_1', 1)$ as follows:

$$(x_1', Y_1', z_1', 1) = (x_1, y_1, z_1, w_1)(xMat')^{-1}.$$

The coordinates for inpnt are determined in a similar manner as opnt, except that $w=f$ and $z_s=1$, where f is the far clipping plane distance. In one embodiment, the far clipping plane distance f is set at 100 yards.

The matrix $(xMat')^{-1}$ is defined as the inverse of the 4 by 4 matrix xMat'. The matrix xMat' is defined as follows:

1. Let (cx, cy, cz) be the world-coordinates of the intersection of the optical axis and the pan axis when tilt=0, ptzfdit.pan=0, and the pan axis is vertical. Note that ptzfdit.pan corresponds to pan encoder values and ptzfdit.tilt corresponds to tilt encoder values. In the case of a virtual surface, (cx, cy, cz)=(0,0,0)
2. Let tiltLevel be the value of ptzfdit.tilt when the pan axis is vertical and the optical axis is perpendicular to the pan axis.
3. Let tilt=ptzfdit.tilt—tiltLevel.
4. If (0, 1, 0, 1) $R'_{z',\Phi_p}$=(ux, uy, 0, 1), where (ux, uy, 0, 1) is the direction, in world-coordinates, of the optical axis when ptzfdit.pan=0, tilt=0, and the pan axis is vertical, then let pan_offset=$\Phi_p$.
5. Let $$R'_{z',\Phi} = \begin{bmatrix} \cos\Phi & \sin\Phi & 0 & 0 \\ -\sin\Phi & \cos\Phi & 0 & 0 \\ 0 & 0 & 1 & 0 \\ 0 & 0 & 0 & 1 \end{bmatrix}$$

6. Let $$R'_{x',\tau} = \begin{bmatrix} 1 & 0 & 0 & 0 \\ 0 & \cos\tau & \sin\tau & 0 \\ 0 & -\sin\tau & \cos\tau & 0 \\ 0 & 0 & 0 & 1 \end{bmatrix}$$

7. Let $$R'_{y',\Theta} = \begin{bmatrix} \cos\Theta & 0 & -\sin\Theta & 0 \\ 0 & 1 & 0 & 0 \\ \sin\Theta & 0 & \cos\Theta & 0 \\ 0 & 0 & 0 & 1 \end{bmatrix}$$

8. Let $$T(a, b, c) = \begin{pmatrix} 1 & 0 & 0 & 0 \\ 0 & 1 & 0 & 0 \\ 0 & 0 & 1 & 0 \\ a & b & c & 1 \end{pmatrix}$$

9. Let $$R(\alpha, \beta) = \begin{bmatrix} \frac{-v_1^2 + 1 + ctheta}{1 + ctheta} & \frac{-v_1 v_2}{1 + ctheta} & -v_1 & 0 \\ \frac{-v_1 v_2}{1 + ctheta} & \frac{-v_2^2 + 1 + ctheta}{1 + ctheta} & -v_2 & 0 \\ v_1 & v_2 & ctheta & 0 \\ 0 & 0 & 0 & 1 \end{bmatrix}$$

where $v_1 = \sin\alpha$, $v_2 = -\sin\beta$, and $$ctheta = \sqrt{1 - v_1^2 - v_2^2}.$$

For the non-vertical pan axis matrix, $R(\alpha, \beta)$, usually $-1.5$ degrees $\leq \alpha \leq 1.5$ degrees, and $-1.5$ degrees $\leq \beta \leq 1.5$ degrees.

10. Let pan=pan_offset−ptzfdit.pan.
11. Let delta_cz (tilt) be defined such that cz+delta_cz(tilt)

is the z-coordinate, in world-coordinates, of the intersection of the optical axis and the pan axis for tilt= ptzfdit.tilt−tiltLevel.

Note: delta_cz(0.0)=0.0.

12. Let nodal (doubler, zoompercent) be the distance from the front piece of glass on the lens to the nodal point along the optical axis for a given doubler and zoompercent.
13. Let lens_length be the length from the front piece of glass on the lens to the pan axis when the pan axis is vertical and the optical axis is perpendicular to the pan axis. In one embodiment, a nominal values for lens_length is 20 inches.
14. Let nodal_dist (doubler, zoompercent) be the distance from the pan axis along the optical axis to the nodal point for a given doubler and zoompercent.
15. Let delta_lens(tilt) be defined to be the value such that nodal_dist(doubler,zoompercent)=lens_length+ delta_lens(tilt)−nodal(doubler, zoompercent), where tilt=ptzfdit.tilt−tiltlevel.

Note that delta lens(0.0)=0.0.

16. Let n be the near clipping plane distance.
17. Let f be the far clipping plane distance.
18. Let ar be the aspect ratio of the horizontal length of the image plane to the vertical length of the image plane. In one embodiment, example values include n−=1 yard, F=100 yards, and ar=(640/480)=4/3.
19. Let fovy be the angle corresponding to the vertical field of view of the camera.

20. Let $$P = \begin{bmatrix} \frac{\cot\left(\frac{fovy}{2}\right)}{ar} & 0 & 0 & 0 \\ 0 & \cot\left(\frac{fovy}{2}\right) & 0 & 0 \\ 0 & 0 & \frac{-(f+n)}{(f-n)} & -1 \\ 0 & 0 & \frac{-2fn}{(f-n)} & 0 \end{bmatrix}$$

21. Let $$P^{-1} = \begin{bmatrix} \frac{ar}{\cot\left(\frac{fovy}{2}\right)} & 0 & 0 & 0 \\ 0 & \frac{1}{\cot\left(\frac{fovy}{2}\right)} & 0 & 0 \\ 0 & 0 & 0 & \frac{-(f-n)}{2fn} \\ 0 & 0 & -1 & \frac{(f+n)}{2fn} \end{bmatrix}$$

22. Let (camrpx, camrpy, camrpz) be defined such that when the pan axis is not vertical, the camera is rotated about a line contained in the plane perpendicular to (0, 0, 1) that contains the point (cx+camrpx, cy+camrpy, cz+camrpz) in world-coordinates. In one embodiment, nominal values for (camrpx, camrpy, camrpz) are (0, 0, −1.5), which corresponds to a point 1.5 yards below the (cx, cy, cz).

23. $M_{c,w}$ is the 4 by 4 matrix that transforms from camera-coordinates to world-coordinates when the pan axis is vertical. $M_{w,c}$ is the 4 by 4 matrix that transforms from world-coordinates to camera-coordinates when the pan axis is vertical. $M'_{w,c}$ is the 4 by 4 matrix that transforms from world-coordinates to camera-coordinates when the pan axis is not necessarily vertical.

Let the 4 by 4 matrix $M_{c,w}$ be defined by $$M_{c,w} = R_{'x',\frac{\pi}{2}} R_{'y',twist} R_{'x',tilt} R_{'z',pan} T(nx, ny, nz)$$

where (nx, ny, nz, 1)=(0, nodal_dist (doubler, zoompercent), 0, 1) $M_A$, $M_A$=$R_{'y',twist}R_{'x',tilt}R_{'z',pan}T$(cx, cy, cz+delta_cz(tilt)) nodal_dist (doubler, zoompercent)= lens_length+delta_lens(tilt)−nodal(doubler, zoompercent).

Let $M_{w,c}=M_{c,w}^{-1}$, the inverse of the matrix $M_{c,w}$.

Let xMat=$M_{w,c}$P where P is defined by (20.).

The angle, twist, is a counterclockwise rotation of the lens of the camera about a vector in the direction of the optical axis, where the amount of the rotation is twist radians.

Let the 4 by 4 matrix $R'_{w,w}$ be defined by $$R'_{w,w}=T(-a_1, -b_1,-c_1)R_{'z',pan\_offset}R(\alpha,\beta)^T R_{'z',pan\_offset}T(a_1,b_1,c_1)$$

where $a_1$=cx+camrpx, $b_1$=cy+camrpy, $c_1$=cz+camrpz.

When tilt=0, ptzfdit.pan=0, and the pan axis is vertical, the unit vector in the direction of the optical axis is in the same direction as the roll axis of the inclinometers, and the unit vector corresponding to the cross product of the roll axis and the pan axis is in the same direction as the pitch axis of the inclinometers. When the pan axis is not vertical because the roll is a degrees and the pitch is β degrees, the 4 by 4 matrix R(α, β) is the rotation matrix transformation that describes the new orientation of the inclinometers, and hence the pan axis.

Let $M'_{w,c}=R'_{w,w}M_{w,c}$.

and xMat'=$M'_{w,c}$P.

After step 314 of FIG. 8 is completed, telestration processor 108 has a set of points in the three dimensional coordinate system relating to the virtual surface (and camera) representing the curve drawn by the operator. In step 316 for FIG. 8, the curve is thickened. That is, telestration processor 108 creates a set of quadrilaterals in three dimensional space. The centers of each of the adjacent sides of the quadrilaterals are the points that were transformed in step 314. Step 316 includes storing the vertices for each of these quadrilaterals. This set of vertices defines the thickened line in three dimensional space.

In step 318, telestration processor 108 transforms all the curves to the current video frame (or field). That is, all of the vertices of the current curve just operated on in steps 308–316 are transformed to the two dimensional coordinate system for the video tallied for broadcast. Additionally, there may be other curves or graphics that may be drawn on the screen previously that have been stored in three dimensional space. These curves are also transformed in step 318. The curves are transformed by transforming each of the vertices of the various quadrilaterals representing the curves. The quadrilateral vertices are transformed using transformation matrices.

A point in three-dimensional space is represented by a 4 element row vector: (x, y, z, 1.0). The 1.0 (sometimes called w) allows for translation. In camera space, the point (0,0,0, 1.0) is at the origin. A camera is represented mathematically by a 4×4 matrix (K) which includes details of position and orientation. The three-dimensional point is transformed into a two-dimensional normalized frame position by multiplying the point by the camera matrix (K). The camera matrix (K) is a combination of rotation, translation, and perspective elements, all of which are represented by 4×4 matrices. In reality, the motion of the camera point of view (POV) is much more complicated with offsets caused by the kinematics of the tripod head and the motion of the optical POV along the camera's optical axis due to lens characteristics. All these effects can be modeled as more complex linkages (additional matrices) between the fixed camera base and the resulting POV of the camera as the camera is moved through its range of motion. These techniques are well-known in the art.

In the disclosed embodiment, instrumented cameras are modeled as a 4×4 matrix, which includes two parts—a fixed transformation (X) which represents the position of the camera in the stadium and its orientation, and a variable transformation (V) which varies with changes in pan angle, tilt angle and the zoom:

K=XV

The fixed transformation matrix (X) models x, y, z position as well as fixed yaw, pitch and roll representing the camera's mount orientation:

X=TYPR where, $$T = \begin{bmatrix} 1 & 0 & 0 & 0 \\ 0 & 1 & 0 & 0 \\ 0 & 0 & 1 & 0 \\ -x & -y & -z & 1 \end{bmatrix}$$

$$Y = \begin{bmatrix} \cos yaw & -\sin yaw & 0 & 0 \\ \sin yaw & \cos yaw & 0 & 0 \\ 0 & 0 & 1 & 0 \\ 0 & 0 & 0 & 1 \end{bmatrix}$$

$$P = \begin{bmatrix} 1 & 0 & 0 & 0 \\ 0 & \cos pitch & -\sin pitch & 0 \\ 0 & \sin pitch & \cos pitch & 0 \\ 0 & 0 & 0 & 1 \end{bmatrix}$$

$$R = \begin{bmatrix} \cos roll & 0 & \sin roll & 0 \\ 0 & 1 & 0 & 0 \\ -\sin roll & 0 & \cos roll & 0 \\ 0 & 0 & 0 & 1 \end{bmatrix}$$

The parameters of the matrices T, Y, P & R are determined during registration. The x, y and z variables from matrix (T) are the x, y and z coordinates of the camera in the three dimensional coordinate system that includes the virtual surface. In one embodiment, the camera is at the origin of the three dimensional coordinate system; therefore, the x, y and z coordinates are zero. The pitch variable in matrix (P) is the tilt registration parameter described above. The roll variable of matrix (R) is the twist parameter described above. The yaw variable in matrix (Y) represents a pan offset. In one embodiment using a virtual surface, the yaw value is set to zero. In another embodiment, the camera is pointed at a location that is to be at the zero pan position during the registration process. The value of the pan encoder (in degrees or another unit) while the camera is pointed at that location is the yaw variable.

For a camera used with a Vinton Vector 70 camera head and a Canon J55Super lens, the variable transformation is modeled in four parts (matrices):

V=ADFG $$A = \begin{bmatrix} \cos pan & -\sin pan & 0 & 0 \\ \sin pan & \cos pan & 0 & 0 \\ 0 & 0 & 1 & 0 \\ 0 & 0 & 0 & 1 \end{bmatrix}$$

$$D = \begin{bmatrix} 1 & 0 & 0 & 0 \\ 0 & \cos tilt & -\sin tilt & 0 \\ 0 & \sin tilt & \cos tilt & 0 \\ 0 & 0 & 0 & 1 \end{bmatrix}$$

$$F = \begin{bmatrix} 1 & 0 & 0 & 0 \\ 0 & 1 & 0 & 0 \\ 0 & 0 & 1 & 0 \\ 0 & -povdist & 0 & 1 \end{bmatrix}$$

$$G = \begin{bmatrix} f_h & 0 & 0 & 0 \\ 0 & f_v & 0 & 0 \\ 0 & 0 & -(f+n)/(f-n) & -1 \\ 0 & 0 & -2fn/(f-n) & 0 \end{bmatrix}$$

Matrix (A) models the camera's pan on its fixed base. Matrix (D) models the camera's tilt angle. Pan and tilt angles are measured with the pan and tilt sensors. Matrix (F) models the front nodal point of the lens moving fore and aft along the optical axis of the lens as a function of zoom. The variable povdist (or First Principal Point, or Front Nodal Point) is the position of the camera's virtual point of view measured as a distance forward of the tilt axis when the camera is in the horizontal position. This information can be measured on an optical bench and a lookup table built as a function of zoom position, focus, and 2×Extender setting. The information for the lookup table is measured by placing two targets in the view of the camera, off-center; one farther away than the other, so they appear in line through the viewfinder. Where a line extended through those targets intersects the optical axis of the camera is the position of the virtual point of view. Matrix (G) models the effective focal length of the lens as a function of zoom, focus, and 2×Extender settings. The variables n and f are the distances to the mathematical near and far clipping planes; which are only important in assigning a useful range for z-buffered graphics drawing; therefore, nominal values are used of n=1 yard and f=100 yards. The variable $f_h$ is the effective horizontal focal length of the lens. The variable $f_v$ is the effective vertical focal length of the lens. The aspect ratio, which is constant, is $f_h/f_v$. A software routine is used to convert the appropriate zoom factor and aspect ratio to $f_h$ and $f_v$.

After using the transformation matrices, the system takes into account lens distortion. That is, each two-dimensional pixel position is evaluated in order to determine if the two-dimensional position should change due to lens distortion. For a given two-dimensional pixel position, the magnitude of a radius from the optical center to the two-dimensional pixel position is determined. Lens distortion is accounted for by moving the pixel's position along that radius by an amount $\Delta R$:

$$\Delta R = (R)^2$$

where
R=pixel distance from optical center to two-dimensional position
K=distortion factor.

At a fixed focus, the distortion factor is measured at a number of zoom values and focus settings using a GUI slider to align the model to the video. These values are used to generate a distortion curve. During operation, the distortion factor at the current zoom is interpolated from the curve and applied to all transformed two-dimensional pixel positions points. The distortion data can also be obtained from the lens manufacturer or can be measured by someone skilled in the art.

After transforming all of the curves and/or graphics to the current video frame, the system tessellates the curves in step 320 of FIG. 8. Tessellation involves breaking up the quadrilaterals if the cameras have zoomed in past a certain threshold. One example of a threshold is testing whether the sides of the quadrilaterals are more than 15 pixels. For a particular quadrilateral, if the threshold has been met then the quadrilateral is subdivided into small quadrilaterals. In one embodiment, the system will divide the length and width (in pixels) of the quadrilaterals by 15, with the result being the number of sections the length or width must be broken up. In one alternative, the number of sections is rounded to the nearest power of two for convenience.

In step 322, telestration processor 108 determines alphas for a subset of the pixels for the current video field (or frame) to be blended. These alphas will be used to derive the alpha signal 170 sent by rendering processor 150 to program keyer 152 and/or offline keyer 154. In one embodiment, step 322 includes determining alpha values for each vertex of each quadrilateral after tessellation (step 320).

After step 322, telestration processor 108 adds the graphics to the program video and sends the enhanced program video to display 102. This output sent to display 102 may not suitable for broadcast. The final broadcast video is provided by program keyer 152. After determining the alphas in step 322, telestration processor 108 sends the information to rendering processor 150 in step 324 and the system loops back to step 302.

If, in step 304, telestration processor 108 determines that it has not received any new points, then an inquiry is made (step 340) as to whether the user has finished drawing the curve. In one embodiment, when the user lifts the user's finger or light pen from touch screen 104, a pen-up event is generated which signals that the user has finished drawing the curve or graphic. When there is a pen-up event, the method loops to step 344 and the system will save the curve in three dimensional coordinates. That is, the points that were the result of step 316 are saved. If there was no pen-up event, the method loops to step 348. If telestration processor 108 is performing step 348, it is assumed that no new curve data has been received and the system needs to redraw the existing curves onto the new field (or frame of video). In step 348, telestration processor 108 identifies the correct sensor data (similar to step 312). After accessing the correct data in step 348, telestration processor 108 loops to step 318 and continues the process from step 318 to draw the existing curves for the current field or frame of video. It is contemplated that the interface for the present invention could include an erase button which causes all curves currently being displayed to be erased and the system to be reset in that respect.

Figure 9:
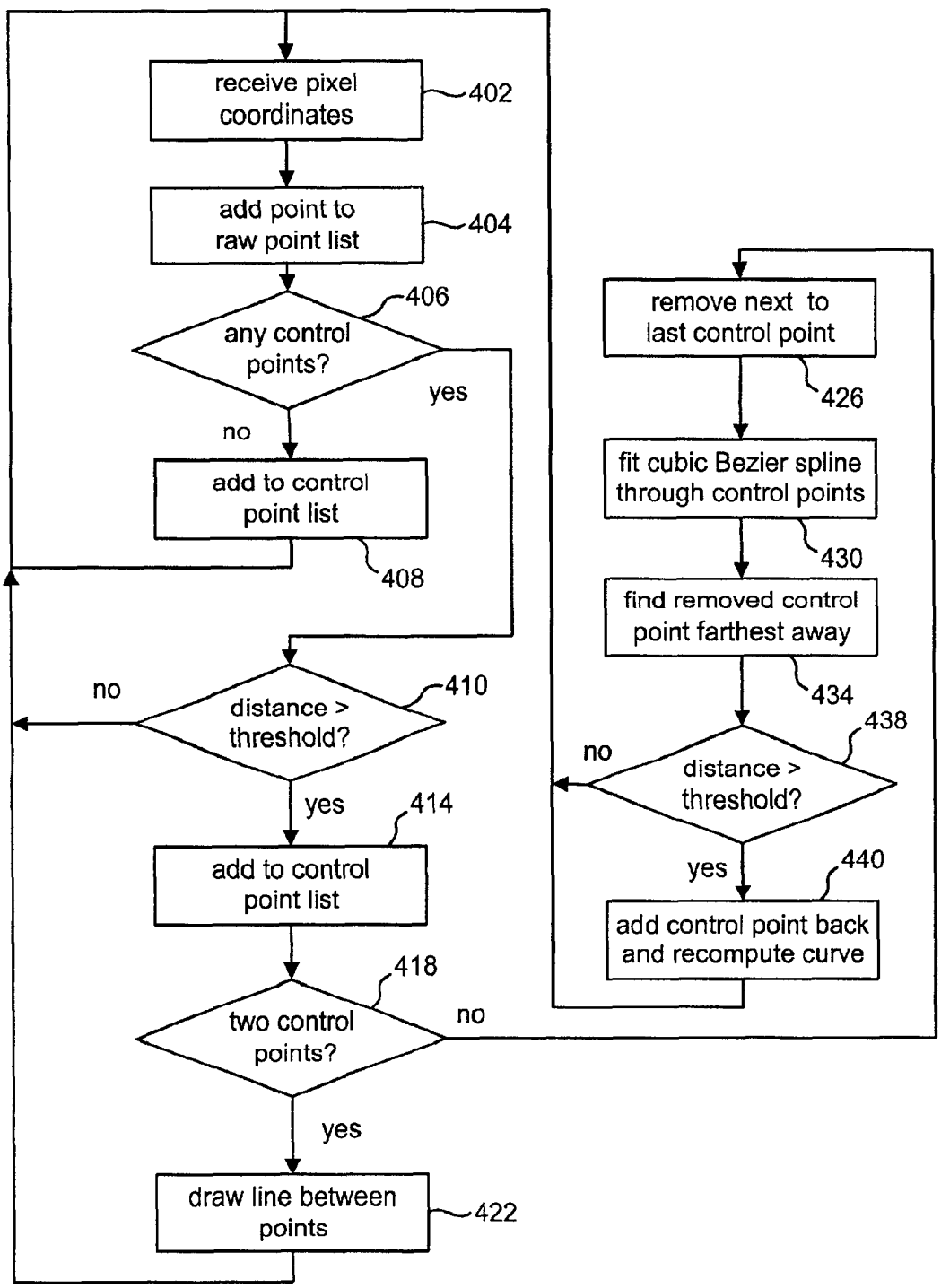
FIG. 9 is a flow chart describing the process of smoothing a curve.

FIG. 9 is a flow chart describing more detail of step 308 of FIG. 8, smoothing the curve of points received from touch screen 104. In step 402, the process receives the pixel coordinates. These pixel coordinates have an X coordinate and a Y coordinate pertaining to the position on touch screen 104. In step 404, the coordinates are added to a raw point list. The system also maintains a control point list. In step 406, the system determines whether there are any points on the control point list. If there are no points on the control point list, then the raw points just received in step 402 are added to the control point list in step 404 and the method loops back to step 402.

If in step 406, it is determined that the control point list does include one or more control points, then the method loops to step 410 and telestration processor 108 determines whether the most recent point added to the raw point list in step 404 is a distance greater than a threshold from the last control point added to the control point list. An example of a suitable threshold is ten pixels. If the distance between the most recent raw point and the last current point is not greater than the threshold, then the method loops back to step 402. If the distance between the most recent raw point and the last control point is greater than the threshold, then the method loops to step 414 and the most recent raw point is added to the control point list. If the number of control points in the control point list is exactly two points, then the method loops to step 422 and a line is drawn between these two points. After step 422, the method loops back to step 402. If in step 418, there are more than two control points in the control point list, the method loops to step 426, at which point the next to last control point is removed from the control point list. In step 430, telestration processor 108 will fit a cubic Bezier spline through the control points. In step 434, telestration processor 108 will find the removed control point that is farthest away from the curve. A removed control point is a point that was once on the control point list, but was subsequently removed from the control point list. In step 438, telestration processor 108 will determine whether distance from the curve to the removed control point found in step 434 is greater than a threshold (e.g. ten pixels). If the distance is not greater then the threshold, the method loops back to step 402. If the distance is less than or equal to the threshold, then in step 440 that removed control point is added back to the control point list and the cubic Bezier spline is re-computed.

Figure 10:
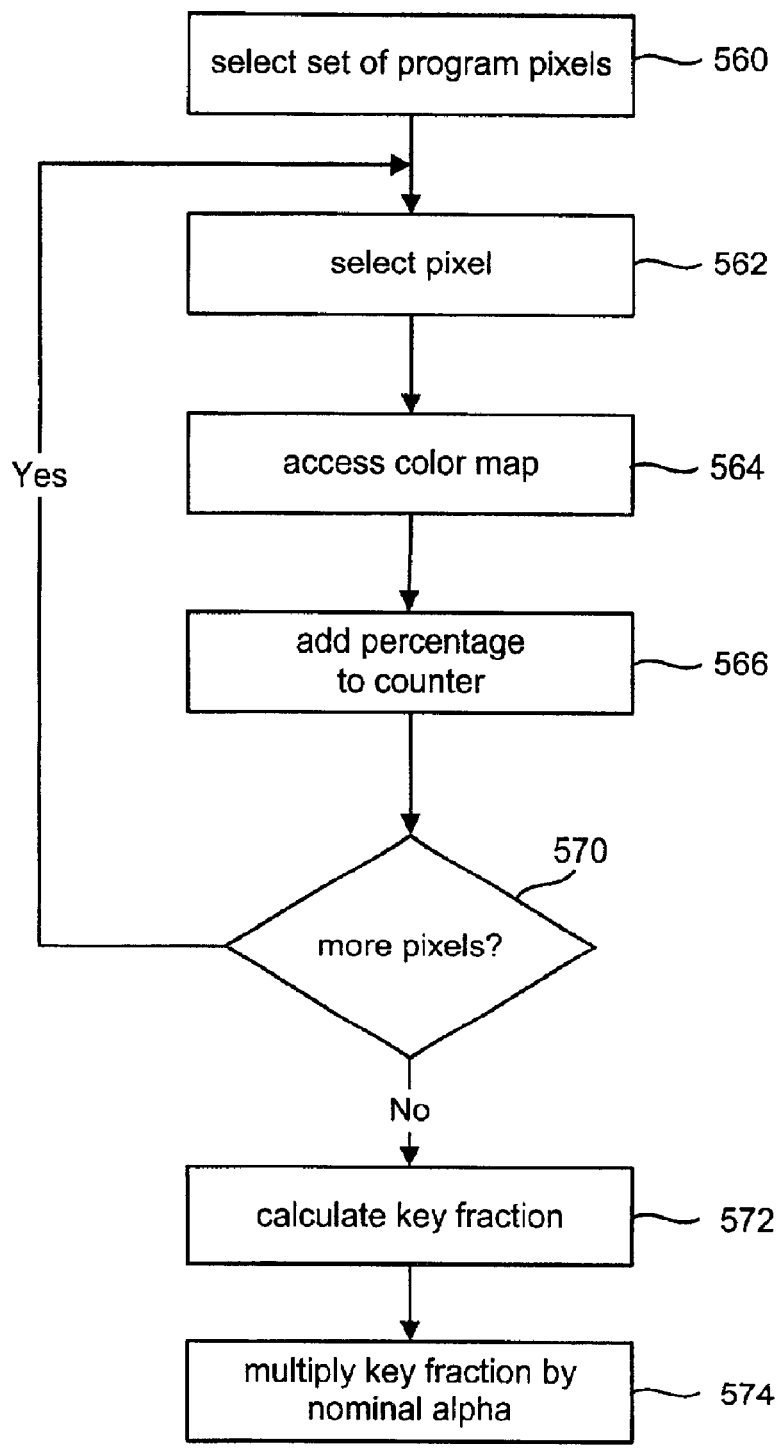
FIG. 10 is a flow chart that explains one embodiment of the process of determining alpha values for pixels in a video.

FIG. 10 illustrates a sequence of operations performed in one embodiment of the present invention for determining an alpha value for one of the vertices of a quadrilateral. The process of FIG. 10 is performed as part of step 322 of FIG. 8. First, a set of pixels in the program video is selected in step 560. In one embodiment, the set of pixels in the program video include the pixel in the program video having the same coordinates as the vertex under consideration. Additionally, the set contains at least four pixels surrounding the pixel in the program video having the same coordinates as the vertex under consideration. In other embodiments, more or fewer than four additional pixels can be used. In one alternative, the four pixels are adjacent to the pixel in the program video having the same coordinates as the vertex under consideration. In other embodiments, the four pixels are a predefined distance away from the pixel in the program video having the same coordinates as the vertex under consideration. The predefined distance can be selected from experimentation based on the desired effect. In step 562, one of the pixels in the set is selected. In step 564, the color of the pixel is used to access the color map. That is the Y, Cr and Cb values or characteristics for the pixel are used to access the appropriate alpha percentage in the color map described above. In step 566, the alpha percentage accessed in the color map is added to a counter.

In step 570, a determination is made as to whether there are more pixels to be considered from the set of pixels. If there are more pixels to be considered, then a new pixel from the set is selected in step 562. Otherwise, a key fraction is calculated in step 572. In one embodiment of the present invention, the key fraction is calculated by dividing the counter value by the total number of pixels in the selected set of program pixels. At step 572, the counter value should equal the sum of the alpha percentages for each pixel in the set. The key fraction, therefore, represents the average alpha percentage for the set. It is contemplated that other means can be employed to determine the key fraction.

Once the key fraction is calculated, the alpha value for the vertex is determined in step 574 by multiplying the key fraction by a nominal alpha. The nominal alpha is set in advance by the user to set the overall transparency or look of the graphic. In one embodiment, a slider on a graphical user interface allows a user to see how changing the nominal alpha changes the keying. The above described process is repeated for each of the vertices. An alternative method for determining alphas and drawing graphic is described in U.S. Pat. No. 6,229,550, incorporated herein by reference.

Figure 11:
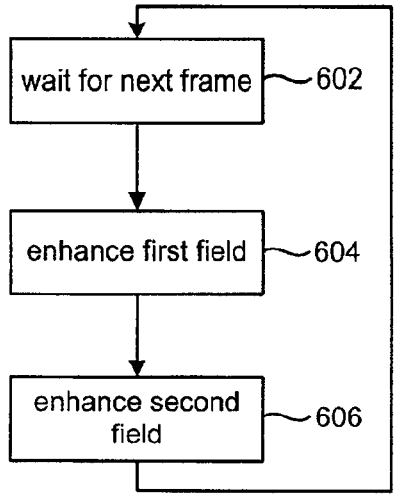
FIG. 11 is a flow chart describing a portion of the operation of one embodiment of the present invention.

FIG. 11 is a flow chart which describes the operation of rendering processor 150 during operation of the system. In step 602, rendering processor 150 waits for the next frame to start. Rendering processor 150 receives the program video from video delay 158. By looking at the program video, rendering processor 150 determines when the next frame is starting. Rendering processor 150 receives data from telestration processor 108. This data includes the pixel coordinates of the vertices of the polygons to be drawn, tessellations per quadrilateral (number of subdivides), alphas for the vertices of the quadrilaterals, the colors of the polygon, texture, fill characteristics for the polygons and time code for the frame or field associated with the data. When rendering processor 150 identifies that the start of the next frame, it performs the step of enhancing the first field (step 604). After enhancing the first field, rendering processor then enhances the second field in step 606. After enhancing the second field, rendering processor waits for the next frame in step 602.

Figure 12:
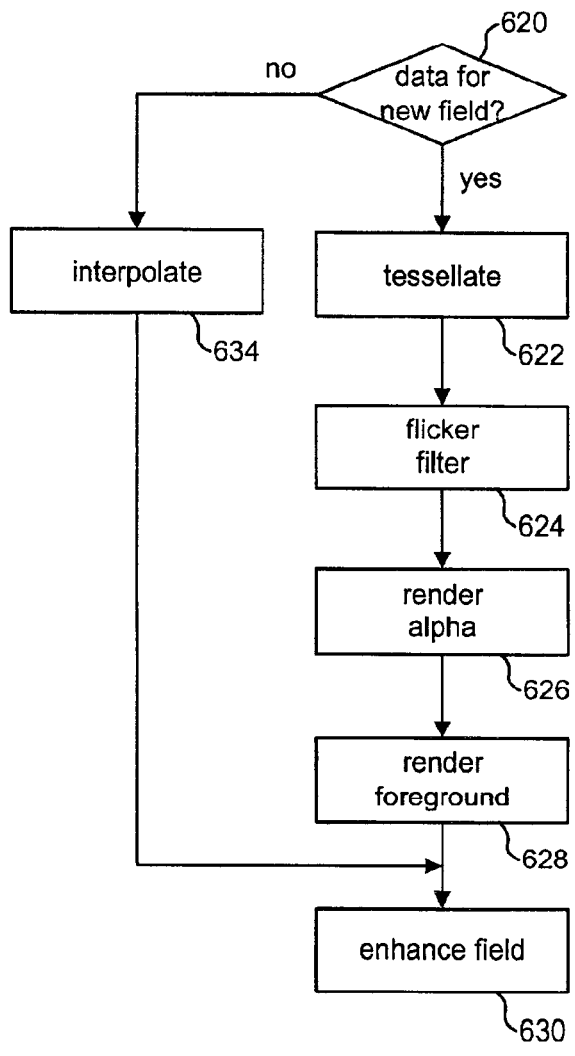
FIG. 12 is a flow chart describing the steps for enhancing a field of video for one embodiment of the present invention.

FIG. 12 describes the process for enhancing a field of video. In step 620, rendering processor 150 determines whether it has data for the field that is to be enhanced. That is, by looking at the time code associated with the field from the delayed program video, rendering processor 150 looks for the data from telestration processor 108 having a similar time code. If that data is found, then it has data for the new field. Otherwise, there is no data for the particular field under consideration. If there is data for the field under consideration, then in step 622 rendering processor 150 will tessellate the quadrilaterals. Telestration processor 108 performed tessellate step 320 previously in FIG. 8. When telestration processor 108 sent the data to rendering processor 150, telestration processor 108 sent the alphas for all the vertices; however, it did not send the coordinates for the new vertices created during tessellate step 320. Thus, in step 622, rendering processor 150 will tessellate the quadrilaterals and determine the appropriate coordinates of the new vertices. In step 624, a flicker filter will be applied to the data.

The flicker filter of step 624 is employed to reduce flickering in the appearance of the graphic. The flicker filter averages a newly calculated alpha for the pixel with past and future alphas for the same pixel to generate a filtered alpha. In one embodiment of the present invention, the flicker filter operation is performed according to the following equation:

$$\alpha_F = \frac{(\Sigma \alpha_{FP} + \alpha + \Sigma \alpha_U)}{N}$$

wherein
$\alpha_F$ is the filtered alpha;
$3\alpha_{FP}$ is a summation of filtered alphas for the selected pixel in prior video frames;
$\alpha$ is the unfiltered alpha of the selected pixel for the current video frame;
$3\alpha_U$ is a summation of unfiltered alphas for the selected pixel for future video frames; and
N is a number of values being averaged.

It is possible to obtain filtered alphas for pixels using future alpha values, because delays in the system provide for the calculation of alphas several frames in advance of their use. In one embodiment, $3\alpha_{FP}$ is the sum of the selected pixel's filtered alphas for the two video frames preceding the current video frame; $3\alpha_U$ is the sum of the selected pixel's filtered alphas for the two video frames following the present video frames; and N is equal to 5. In an alternate embodiment, the summation of filtered alphas for the selected pixel in prior video frames ($3\alpha_{FP}$) is replaced by a summation of unfiltered alphas for the selected pixel in prior video frames. In one embodiment of the present invention, the flicker filter operation is applied to the alphas of the center points, border points and edge points. In alternate embodiments, the flicker filter is applied to only a subset of the alphas of the center points, border points, and edge points. In yet another embodiment, the flicker filter is applied to each pixel to be blended. In further embodiments, the flicker filter operation is not employed. In still further embodiments, values of alphas from different times can be weighted differently.

Looking back at FIG. 12, in step 626, rendering processor 150 determines the alpha signal to be sent to the keyers. This step includes taking all the alpha values and creating a signal in the appropriate video format accepted by the keyer. In step 628, rendering processor 150 renders the foreground. This step includes creating a signal in the appropriate video format accepted by the keyer. In one embodiment, steps 626 and 628 occur at the same or overlapping times. One embodiment for rendering the foreground and alpha signals includes dividing the graphic into regions with each region being defined by a set of vertices. In one embodiment, the vertices of steps 626 and 628 are the vertices of the quadrilaterals determined from the tessellate step. If there was no tessellation, then the vertices are the vertices of steps 626 and 628 are the vertices of the quadrilaterals without tessellation.

For each region, the fill characteristics and alpha of each of vertex of the region is employed to establish the fill characteristic and alpha for each pixel within the region. For example, a region can be rendered with all pixels having the same fill characteristics and varying alphas. The alpha for each of the pixels in the region is determined by using interpolation based on the alphas for each vertex defining region.

In one embodiment of the present invention, rendering processor 150 generates and supplies the graphic by executing instructions from a program stored in memory. In one embodiment, the computer uses the Open GL language and generates a set of polygons using a glBegin, glEnd command in conjunction with a GL_QUADS instruction. The GL_QUADS instruction provides sets of vertices to the glBegin, glEnd command for drawing quadrilaterals. Also provided ate the alphas and fill characteristics for each vertex. A quadrilateral is generated by the glBegin, glEnd command for each set of four vertices that is provided.

In an alternate embodiment to the present invention, graphics can be provided with regions that have more or fewer than four vertices and/or different fill characteristics for each of the vertex pixels. When a different number than four vertices are employed, the segments that are rendered will be a shape other than a quadrilateral. When different fill characteristics are provided for each vertex pixel, in one embodiment of the present invention, bilinear interpolation is employed to determine the fill characteristics for each of the pixels in the region based on the fill characteristics for the region's vertex pixels.

In another embodiment, rendering processor 150 performs the blending of the graphic with the video, rather than using a keyer.

Look back at FIG. 12, in step 630, rendering processor 150 causes the current field to be enhanced. In various embodiments, the enhancement is performed by blending the foreground using a keyer, a video processor or other equipment to combine video images or edit program video.

In further embodiments of the present invention, each pixel in the graphic can be analyzed individually to determine its alpha. In one such embodiment, the above described process for determining the alpha for vertex can be employed for each of the pixels in the graphic.

An alpha value or signal is one example of a blending coefficient. A blending coefficient is a value used to indicate how to blend one image or video with a second image or video. The above discussion describes a means for determining alphas for various pixels and using the determined alphas for blending a graphic using a keyer or a computer. It is contemplated that other technologies can be used to blend the graphic and that these other technologies may use different blending coefficients than an alpha signal.

In one embodiment, the lines, shapes or graphics drawn using the telestrator system of the present invention can have varying width, color, texture or levels of transparence. Touch screen 104 and display 102 can include a graphical user interface which allows the user to select color, line width, texture or transparency. Additionally, texture can be a function of zoom. That is, the more a camera is zoomed in, the more a grass-like texture is added to the illustrations. In alternative embodiments, the user interface for determining texture, color, line width and transparency is provided in a television production studio, on telestration processor 108 or on rendering processor 150.

The embodiments discussed above contemplate the use of camera sensors to determine the attitude of the camera. An alternative to (or augmentation to) camera sensors includes using pattern recognition or other types of image recognition. By looking for known locations or known images in a video, telestration processor 108 can determine the attitude of the camera. One example is to use infra red beacons or special lights throughout the event. Telestration processor 108 can look for these beacons or lights in the video from the broadcast camera or a lens-mounted slave camera that is zoomed in. Another alternative is to pre-select landmarks in the scene prior to the event. The coordinates of these landmarks can be preset. By searching for these landmarks in the video, telestration processor 108 can determine the attitude of the camera. In another embodiment, camera sensors can be replaced by pattern recognition allowing the system to recognize landmarks near a user's drawings on the video. Then by finding these landmarks in future frames or fields, telestration processor 108 can determine the position in the subsequent frames to place the drawing. Another embodiment of the present invention can utilize a combination of camera sensors and pattern recognition to place the graphics on the video. One example of such an embodiment uses camera sensors to get a rough estimate of where the graphic should be placed and uses pattern recognition to refine that estimate.

Figure 13:
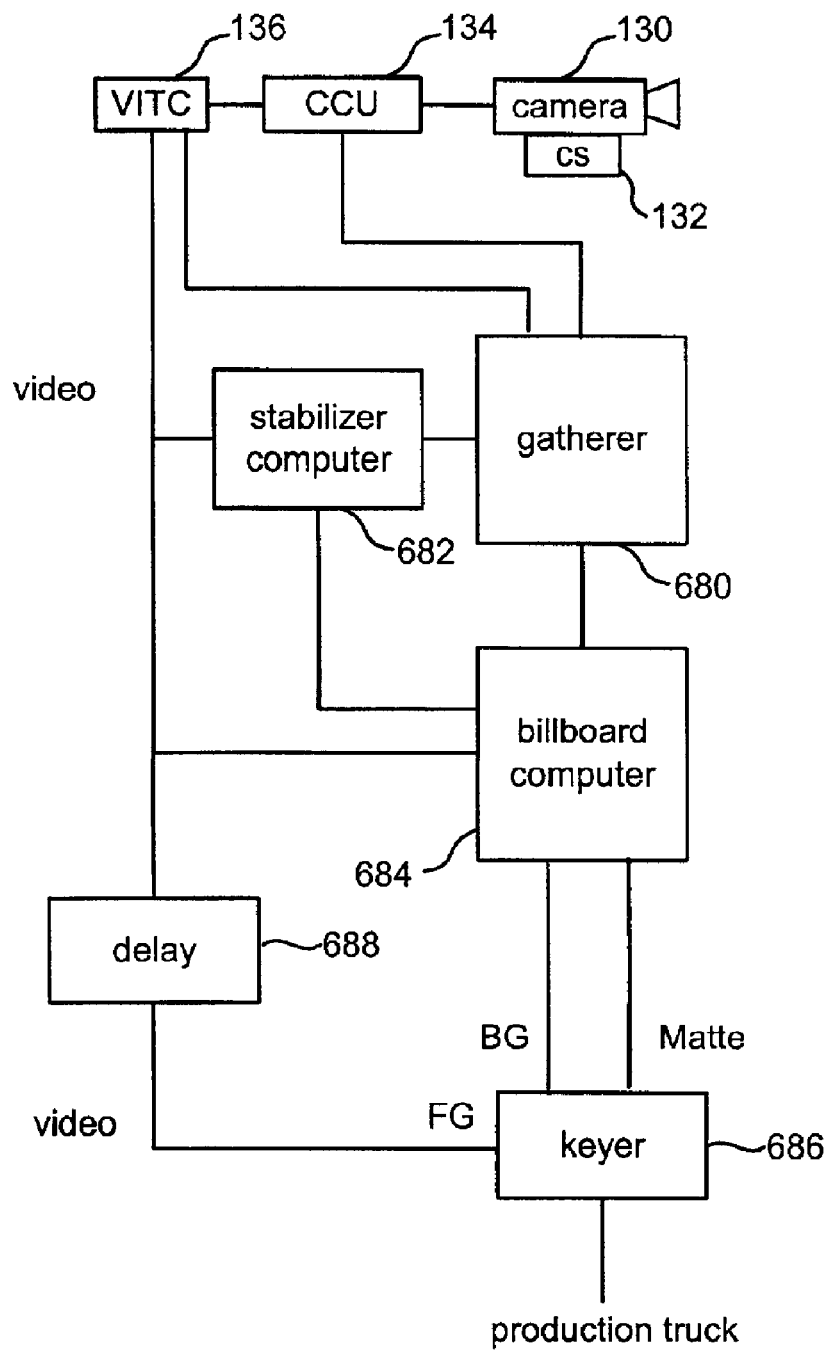
FIG. 13 is a block diagram of one exemplar set of hardware used to implement a second embodiment of the present invention.

FIG. 13 is a block diagram of exemplar hardware for a second embodiment of the present invention. This second embodiment, which uses much of the technology described above, is particularly suited for adding virtual advertisements to a video. A virtual advertisement is an image that serves as an advertisement, where the image appears in the video but is not at the actual scene being captured in the video. Virtual advertisements can be added to video where no advertisements existed or can added to video to replace an existing advertisement. Virtual advertisements can be added to video while accounting for occlusions or can be added to video without accounting for occlusions.

Camera 130, camera sensors 132, CCU 134 and VITC 136 operate in a similar manner as discussed above with respect to FIG. 5. Data from the camera sensors is added to the audio signal for camera 130 and eventually sent from CCU 134 to gatherer 680. A demodulator (not shown) is used to extract the camera data from the video signal. FIG. 13 also depicts gatherer 680, stabilizer 682, billboard computer 684, keyer 686 and delay 688. Gatherer computer 680 receives camera sensor data from camera sensors 132 and stabilization data from stabilizer computer 682. Gatherer 680 packages the information and sends it to billboard computer 680. Stabilizer computer 682 determines offsets that are used to account for errors in the camera sensor data, which improves the determined positions in the video for adding the virtual advertisements. Billboard computer 684 performs functions analogous to telestration processor 108 and rendering processor 150. In one embodiment, billboard computer receives the data from Gatherer 680, receives video from VITC 136, determines where to add the virtual advertisement in the video and sends the appropriate signals to keyer 686 to blend the virtual advertisement into the video. Billboard computer 684 also communicates with stabilizer computer 682. Billboard computer 684 sends registration information to stabilizer computer 682 and receives correction information from stabilizer computer 682. Delay 688 receives the video signal from VITC 136, delays the video and sends the delayed video to keyer 686. Because the video is delayed, it is also necessary to delay the audio signal (which is not depicted in FIG. 13). The output of keyer 686 is transmitted to the production truck, or another suitable location. In one implementation, each camera that is being used for the present invention will have its own set of equipment as depicted in FIG. 13.

In one embodiment, keyer 686 is an Ultimatte from Ultimatte Corporation (www.ultimatte.com). The video from delay 688 is transmitted to the foreground input of the Ultimatte, the virtual advertisement is transmitted to the background input of the Ultimatte and billboard computer 684 supplies a matter signal to the Ultimatte. In one implementation, the matte signal is white where the billboard is to be added to the video and black where the billboard is not added to the video. In another embodiment, the matte signal is gray scale.

In one embodiment, the system of FIG. 13 will include key data processor 116 in order to account for occlusions. That is, the system will blend the image of the virtual advertisement with the video according to the color map and processes described above.

FIG. 14 is a flow chart that describes the set-up procedures for one embodiment of the operation of the system of FIG. 13. In step 700, camera 130 is pointed at the location where the virtual advertisement will be inserted. For example, in a telecast of a baseball game the virtual advertisement may be inserted into the video such that it appears to be painted on the wall behind home plate. In that case, step 700 includes pointing camera 130 to the portion of the wall behind home plate where the virtual advertisement will be inserted. In one embodiment, the operation of the system may be improved if the relevant portion of the wall behind home plate is a uniform color. One way to guarantee such a uniform color is to mount a board on the wall, where the board is painted the desired color. The invention will work, however, without such a board. In step 702, an operator of the system will select the four corners of a rectangle bounding the portion of the wall behind home plate where the virtual advertisement will be inserted. The selection can be made using a mouse or any other pointing or selection device. In one implementation, step 702 includes using a mouse, light pen or other pointing device to drag and size the edges of a box indicate the portion of the wall behind home plate where the virtual advertisement will be inserted. In step 704, the four corners selected in step 702 are transformed to three dimensional locations on the virtual surface using the mathematics described above. In an alternative embodiment, the operator of the system may select one or more points as reference points. The system will then use the reference points to determine the four corners. For example, the system can be set up so that the operator need only indicate the center of the location to add a virtual advertisement. The system can then figure out where the four corners are based on the selection of the center point. In some embodiments, some of the corners are on the virtual surface and other corners are off the virtual surface. In other embodiments, all the corners are off the virtual surface.

In step 706, the operator of the system will select a set of edges for use by stabilizer computer 682. The edges selected should be easy to see. It is preferred that the edges selected are not in the exact location of or near the perimeter of where the virtual advertisement will be inserted. In other embodiments, the selected edges can be in the exact location where the virtual advertisement will be inserted. When an edge is selected, the operator indicates whether the edge is a horizontal edge or a vertical edge. Each selection of an edge identifies one pixel as the edge. An edge is a color transition in the video image. An edge is a horizontal edge if the transition is made between consecutive pixels in a vertical direction, thus (possibly) creating a horizontal line. An edge is a vertical edge if the transition is made between consecutive pixels in a horizontal direction, thus (possibly) creating a vertical line. It is recommended that at least five vertical edges and five horizontal edges are selected, but more is better (e.g. twenty five vertical edges and twenty five horizontal edges). The edges are selected using a mouse or other pointing device. In step 708, the position of the edge pixels are transformed to locations on the virtual surface using the mathematics discussed above. In addition to transforming the edge pixel, the system stores the color values (e.g. Y, Cr, Cb) for the edge pixel, the color values for seven pixels to one side of the edge pixel, and eight pixels to the other side of the edge pixel. For a horizontal edge, the sixteen consecutive pixels are on a vertical line. For a vertical edge, the sixteen consecutive pixels are on a horizontal line.

FIG. 15 is a flow chart describing the operation of billboard computer 684 after the set-up process of FIG. 14. In step 750, billboard computer 684 accesses the relevant camera sensor data, based on time code, for the field being enhanced. In step 752, the corners of the virtual billboard on the virtual surface are transformed to the positions in the current field using the camera sensor data and the mathematics described above.

In step 754, the positions of the corners of the virtual billboard are adjusted by an X offset and a Y offset. The X offset and the Y offset are generated by stabilizer computer 682. In an ideal world, the camera sensor data is error free and the corner positions calculated in step 752 match the actual positions of the corners in the current field. However, due to movement of the platform supporting the camera, as well as other real world effects, in some cases it is possible that the corner positions calculated in step 752 may differ from the actual positions of the corners in the current field by a small offset. Stabilization computer 682 is used to determine this offset. Some embodiments of the present inventions do not use a stabilization process and, therefore, do not perform step 754 and do not use stabilizer computer 682.

In step 756, the image of the virtual advertisement is scaled to fit within the four corners determined above. In one alternative, the operator of the system will have many advertisements to use and step 756 will include selecting a virtual advertisement. In some embodiments, if the virtual advertisement is not a rectangle, then the image of the virtual advertisement can be filled in to make a rectangle. In step 758, the scaled image of the virtual advertisement is transmitted to keyer 686 as the background signal. In step 758, the matte signal is transmitted to keyer 686. The image of the virtual advertisement is added to the video by keyer 686 in step 760 and the resulting video is sent for broadcast and/or storage in step 764.

In one embodiment, the process of FIG. 14 is performed prior to the start of an event and the process of FIG. 15 is performed for each field of video during the event that the producer desires to use the effect. Alternatively, the process of FIG. 15 cab be performed for every other field or every N fields (with interpolation in between), every frame, etc. Thus, one embodiment includes a set of corners being transformed to the virtual surface once, and from the virtual surface to the video many times. In some embodiments, the process of FIG. 14 will be performed multiple times, for example, when it is desired to move the position of the virtual advertisement (or other graphic).

FIG. 16 is a flow chart describing the process of determining the stabilization offsets used in step 754 of FIG. 15. In step 800 of FIG. 16, the position of the edge points on the virtual surface (from steps 706 and 708) are transformed to the current field of video using the mathematics discussed above. In step 804, stabilizer computer 682 attempts to match the edges transformed in step 802 with the same edges in the current field. In an ideal world, the camera sensor data is error free and the edge positions calculated in step 802 match the actual positions of the edges in the current field. However, as explained above, in some cases it is possible that the edge positions calculated in step 802 may differ from the actual positions of the edges in the current field by a small number of pixels. Step 804 attempts to determine where the actual edges are in the current field of video. In some cases, the actual edges are at the position determined in step 800. In cases where the actual edges are at a different position than determined in step 800, the system determines a delta X and a delta Y as part of step 802. The delta X is the difference between the X position determined in step 800 and the actual X position. The delta Y is the difference between the Y position determined in step 800 and the actual Y position. In step 804, an average delta X and an average delta Y are calculated for all of the edge points.

In step 806, each of the edge positions determined in step 800 are updated by the average delta X and average delta Y values. In step 810, the system attempts to match the transformed edges having positions updated by the average delta X and average delta Y values with the corresponding edges in the current field—essentially a repeat of step 804, but using the updated edge positions from step 806. In step 810, the system determines the new average delta X and an average delta Y values based on step 808. In step 812, "outlier" edges are removed. In one embodiment, an "outlier" edge is an edge having an associated delta X that is more than three pixels different than the latest average delta X or an edge having an associated delta Y that is more than three pixels different than the latest average delta Y. After the "outlier" edges are removed, average delta X and an average delta Y are recalculated in step 814. In step 816, the system determines whether there is enough data being used to calculate the average delta X and the average delta Y. In one embodiment, there is enough data if delta X is based on five or more edge matches and delta Y is based on five or more edge matches. If there is not enough data, then no offsets are reported by the process of FIG. 16 (step 818). If there is sufficient data, then the latest average delta X is reported as the X offset and the latest average delta Y is reported as the Y offset (step 820).

Figure 17:
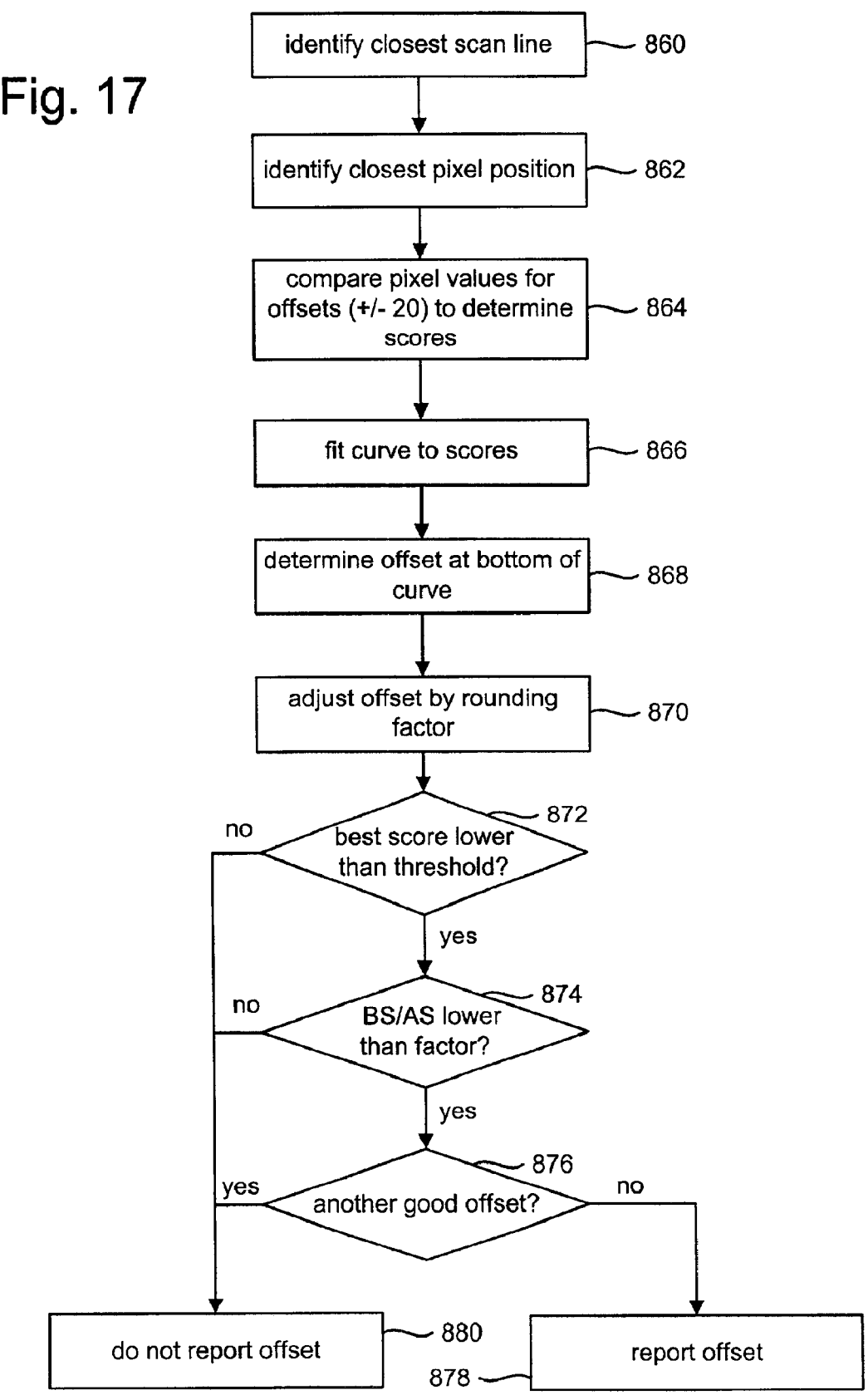
FIG. 17 is a flow chart describing the process for determining a match for a feature.

FIG. 17 is a flow chart describing the process of finding a match for one edge that was transformed in step 800 to the corresponding edge in the current field of video. Steps 802 and 808 include performing the process of FIG. 17 for each transformed edge. In step 860, the system finds the closest scan line to the transformed edge. Each edge had a three dimensional position on the virtual surface that is transformed into X and Y coordinates on the current field. The Y coordinate represents a scan line in the video field. When the three dimensional position on the virtual surface is transformed, the Y coordinate may not necessarily be an integer. Therefore, the transformed Y coordinate is rounded to the nearest integer in order to identify the closest scan line. Alternatively, the system can render to fractional scan lines by using anti-aliasing techniques. In step 862, the system identifies the closest pixel position. That is, the transformed X coordinate pertains to a pixel position on a scan line. If the transformed X coordinate is not an integer, it is rounded to the nearest integer in order to identify a pixel.

In step 864, the color value for the edge pixel and the fifteen pixels on the two sides of the edge pixel (seven on one side, eight on the other side) are compared to the color values of sixteen consecutive pixels in the field. This comparison is performed forty one times. The first comparison is made by lining up the edge pixel with the pixel in the current field having the same pixel position and scan line determined in steps 860 and 862. The other fifteen pixels for the edge are compared against corresponding pixels in the current field. For example, the center pixel may have coordinates (50,100), and the other fifteen pixels may have coordinates of (42, 100), (43, 100), (44, 100), (45, 100), (46, 100), (47, 100), (48, 100), (49, 100), (51, 100), (52, 100), (53, 100), (54, 100), (55, 100), (56, 100), and (57, 100). These sixteen edge pixels are compared to the sixteen pixels in the current field having the same coordinates. The comparison includes determining the difference between the Y values, Cr values or Cb values. Other video formats can also be used. The comparison determines forty eight difference values, which are then added together to determine a score for the entire comparison. This comparison process is done forty more times, generating forty more scores. However, for each additional comparison the sixteen edge pixels are compared against a different set of pixels from the current field by offsetting the coordinates by up to +/−20. If the edge is a horizontal edge, then the X coordinate is changed for each pixel at each comparison. For example, the center edge having coordinates (50, 100) will first be compared against the pixel from the current field having coordinates of (50, 100). Subsequent comparison for that edge pixel will look at pixels in the current field with coordinates of (30, 100), (31, 100), (32, 100), . . . (48, 100), (49, 100), (51,100), (52, 100), (53, 100), . . . , (70, 100). At the end of step 864, there are forty one scores, each score associated with an offset up to +/−20. The above example is explained in regard to a horizontal edge. For a vertical edge, a vertical set of pixels is compared to sets of vertical pixels with the scan line being changed+/−20 scan lines.

In step 866, a curve is fitted to the scores. Symbolically, scores are plotted on a graph with score as the vertical axis and offset as the horizontal axis. A curve is fitted to the data. In one embodiment, the curve is a parabola. The system determines the offset value at the bottom of the curve in step 868 and rounds that offset value to the nearest integer in step 870.

Steps 872, 874 and 876 include three tests for determining whether the offset rounded in step 870 is reliable data. In step 872, the system determines whether the lowest score of all forty one scores is lower than a threshold (e.g. 500). If not, the offset rounded in step 870 is not reported (step 880). In step 874, the system determines whether the lowest score divided by the average score is lower than a test factor (e.g. 0.5). If not, the offset rounded in step 870 is not reported (step 880). In step 876, the system determines whether there is another low offset. That is, is there another valley in the data/curve. If so, the offset rounded in step 870 is not reported (step 880). If not, the offset rounded in step 870 is reported in step 878.

Although the disclosed embodiments describe applications relating to annotating video and adding virtual advertisements, many other types of enhancements can also be made using the current invention.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for enhancing video, comprising the steps of:

defining a virtual surface relative to a camera, said defining includes representing said virtual surface in a three-dimensional coordinate system for said camera, selecting a reference point for said virtual surface relative to said camera, and positioning said virtual surface close to a portion of an environment to be enhanced in an image from said camera;

identifying one or more positions in a first image from said camera;

converting said one or more positions to one or more locations in relation to said virtual surface;

converting said one or more locations in relation to said virtual surface to one or more positions in a second image from said camera; and enhancing said second image based on said one or more positions in said second image.

2. A method according to claim 1, wherein:

said virtual surface is a sphere.

3. A method according to claim 2, wherein:

said first image and said second image are video images;

said first image depicts an environment having an actual surface;

said second image depicts said actual surface;

said one or more positions in said first image are on an image of said actual surface in said first image;

said one or more locations are three dimensional locations on said sphere;

said one or more positions in said second image are on an image of said actual surface in said second image;

said step of enhancing includes editing said second image in relation to said one or more positions in said second image;

said step of converting said one or more locations is based on camera sensor data; and said camera sensor data pertains to an attitude of a camera capturing said second image.

4. A method according to claim 1, wherein:

said step of identifying includes using a pointing device to select one or more pixels on a monitor.

5. A method according to claim 1, wherein:

said step of identifying includes using a pointing device to select one or more pixels on a monitor and using said selected pixels to determine said one or more positions in a first image.

6. A method according to claim 1, wherein:

said step of identifying includes selecting a region of said first image.

7. A method according to claim 1, wherein:

said one or more locations are three dimensional locations on said virtual surface.

8. A method according to claim 1, wherein:

said one or more locations are all on said virtual surface.

9. A method according to claim 1, wherein:

said second image depicts an environment;

said second image is captured by a camera; and said step of converting said one or more locations is performed without surveying a position of said camera in relation to said environment.

10. A method according to claim 1, wherein:

said second image depicts an environment having an actual surface;

said one or more positions in said second image are on an image of said actual surface in said second image; and said step of converting said one or more locations are performed without knowing a distance between said actual surface and a camera capturing said second image.

11. A method according to claim 1, wherein:

said step of converting said one or more locations is based on camera sensor data; and said camera sensor data pertains to an attitude of a camera capturing said second image.

12. A method according to claim 1, wherein:

said step of converting said one or more locations is based on camera sensor data and stabilization offset data;

said camera sensor data pertains to an attitude of a camera capturing said second image; and said stabilization offset data is used to correct said camera sensor data.

13. A method according to claim 12, further comprising the steps of:

identifying positions of edges;

transforming said positions of said edges to edge locations on said virtual surface;

transforming said edge locations to edge positions in said second image using said camera sensor data;

determining said stabilization offset data based on a difference between said transformed edge positions in said second image and actual edge positions in said second image.

14. A method according to claim 1, wherein:

said step of enhancing includes adding an enhancement image to said second image and accounting for occlusions of said enhancement image.

15. A method according to claim 14, wherein:

said step of accounting for occlusions of said enhancement image includes accessing a color map and editing pixels of said second image according to said color map.

16. A method according to claim 14, wherein:

said second image is an image of an environment having an actual surface; and said enhancement image appears to be on said actual surface.

17. A method according to claim 1, further comprising the steps of:

converting said one or more locations in relation to said virtual surface to one or more positions in a third image; and enhancing said third image based on said one or more positions in said third image.

18. A method according to claim 1, wherein:

said first image and said second image are video images;

said first image depicts an environment having an actual surface;

said second image depicts said actual surface;

said step of identifying includes annotating an image of said actual surface in said first image, said one or more positions represent said annotation, said annotation is at a first orientation in relation to said actual surface; and said step of enhancing includes adding said annotation to an image of said actual surface in said second image at said first orientation in relation to said actual surface.

19. A method according to claim 18, wherein:

said step of annotating an image includes receiving a set of points from a touch screen.

20. A method according to claim 1, wherein:

said step of identifying one or more positions in a first image include identifying a position to add a virtual advertisement;

said step of converting said one or more locations includes determining where to add said virtual advertisement into said second image; and said step of enhancing includes adding said virtual advertisement into said second image.

21. A method according to claim 1, wherein:

said step of identifying one or more positions in a first image include identifying a set of positions in an environment, said set of positions bound a virtual advertisement;

said step of converting said one or more positions includes transforming said set of positions in said environment to locations on said virtual surface;

said step of converting said one or more locations includes determining where said set of positions are in said second image; and said step of enhancing includes adding said virtual advertisement into said second image where said set of positions are in said second image.

22. A method according to claim 1, wherein:

said one or more positions in said first image are two-dimensional positions;

said one or more locations are three-dimensional locations in relation to said virtual surface; and said one or more positions in said second image are two-dimensional positions.

23. A method according to claim 1, wherein at least one of said one or more locations are not located on said virtual surface.

24. A method for enhancing video, comprising the steps of:
defining a virtual surface relative to a camera, said defining includes representing said virtual surface in a three-dimensional coordinate system for said camera, selecting a reference point for said virtual surface relative to said camera, and positioning said virtual surface close to a portion of an environment to be enhanced in an image from said camera;
determining one or more locations in relation to said virtual surface, said one or more locations corresponding to one or more positions in an image of an actual surface depicted in a first video image; and
converting said one or more locations in relation to said virtual surface to one or more positions in a second video image.

25. A method according to claim 24, further comprising the steps of:
enhancing said second video image based on said one or more positions in said second video image.

26. A method according to claim 25, wherein:
said step of enhancing includes adding an enhancement image to said second video image and accounting for occlusions of said enhancement image.

27. A method according to claim 24, wherein:
said virtual surface is a sphere; and
said one or more locations are three dimensional locations on said sphere.

28. A method according to claim 24, wherein:
said second video image depicts an environment;
said second video image is captured by a first camera; and
said step of converting said one or more locations is performed without knowing a position of said first camera in relation to said environment.

29. A method according to claim 24, wherein:
said one ore more locations in relation to said virtual surface are three-dimensional locations in relation to said virtual surface; and
said one or more positions in said second image are two-dimensional positions in said second image.

30. A method according to claim 24 wherein:
said actual surface is a three-dimensional surface;
said virtual surface is a three-dimensional surface; and
said first video image and said second video image are two-dimensional images.

31. One or more processor readable storage devices for storing processor readable code, said processor readable code for programming one or more processors to perform a method comprising the steps of:
defining a virtual surface relative to a camera, said defining includes representing said virtual surface in a three-dimensional coordinate system for said camera, selecting a reference point for said virtual surface relative to said camera, and positioning said virtual surface close to a portion of an environment to be enhanced in an image from said camera;
determining one or more locations in relation to said virtual surface, said one or more locations corresponding to one or more positions in an image of an actual surface depicted in a first video image; and
converting said one or more locations in relation to said virtual surface to one or more positions in a second video image.

32. One or more processor readable storage devices according to claim 31, wherein said method further comprises the steps of:
enhancing said second video image based on said one or more positions in said second video image.

33. One or more processor readable storage devices according to claim 32, wherein:
said step of enhancing includes adding an enhancement image to said second video image and accounting for occlusions of said enhancement image.

34. One or more processor readable storage devices according to claim 31, wherein:
said virtual surface is a sphere; and
said one or more locations are three dimensional locations on said sphere.

35. One or more processor readable storage devices according to claim 31, wherein:
said second video image depicts an environment;
said second video image is captured by a first camera; and
said step of converting said one or more locations is performed without knowing a position of said first camera in relation to said environment.

36. One or more processor readable storage devices according to claim 31, wherein said method further comprises the steps of:
storing said one or more positions in said image of said actual surface depicted in said first video image, said step of determining includes converting said one or more positions to said one or more locations in relation to said virtual surface; and
enhancing said second video image based on said one or more positions in said second video image.

37. One or more processor readable storage devices according to claim 36, wherein:
said second video image depicts said actual surface;
said step of storing includes storing an annotation of said image of said actual surface, said one or more positions represent said annotation, said annotation is at a first orientation in relation to said actual surface; and
said step of enhancing includes adding said annotation to an image of said actual surface in said second video image at said first orientation in relation to said actual surface.

38. One or more processor readable storage devices according to claim 36, wherein:
said step of storing includes storing a set of positions in an environment, said set of positions bound a virtual advertisement;
said step of converting said one or more positions includes transforming said set of positions in said environment to locations on said virtual surface;
said step of converting said one or more locations includes determining where said set of positions are in said second video image; and
said step of enhancing includes adding said virtual advertisement into said second video image where said set of positions are in said second video image.

39. An apparatus for enhancing video, comprising:
video modification hardware; and
one or more processing devices in communication with said video modification hardware, said one or more processing devices perform a method comprising the steps of:

defining a virtual surface at a desired position with respect to a camera;

identifying one or more positions in an image of an actual surface depicted in a first video image;

determining one or more locations in relation to said virtual surface that correspond to said one or more positions in said image of said actual surface; and converting said one or more locations in relation to said virtual surface to one or more positions in a second video image.

40. An apparatus according to claim 39, wherein said method further comprises the steps of:

enhancing said second video image based on said one or more positions in said second video image.

41. An apparatus according to claim 39, wherein:

said step of enhancing includes adding an enhancement image to said second video image and accounting for occlusions of said enhancement image.

42. An apparatus according to claim 39, wherein:

said virtual surface is a sphere; and said one or more locations are three dimensional locations on said sphere.

43. An apparatus according to claim 39, wherein:

said second video image depicts an environment;

said second video image is captured by a first camera; and said step of converting said one or more locations is performed without knowing a position of said first camera in relation to said environment.

44. An apparatus according to claim 39, wherein said method further comprises the steps of:

storing said one or more positions in said image of said actual surface depicted in said first video image, said step of determining includes converting said one or more positions to said one or more locations in relation to said virtual surface; and enhancing said second video image based on said one or more positions in said second video image.

45. An apparatus according to claim 44, wherein:

said second video image depicts said actual surface;

said step of storing includes storing an annotation on said image of said actual surface depicted in said first video image, said one or more positions represent said annotation, said annotation is at a first orientation in relation to said actual surface; and said step of enhancing includes adding said annotation to an image of said actual surface in said second video image at said first orientation in relation to said actual surface.

46. An apparatus according to claim 44, wherein:

said step of storing includes storing a set of positions in an environment, said set of positions bound a virtual advertisement;

said step of converting said one or more positions includes transforming said set of positions in said environment to locations on said virtual surface;

said step of converting said one or more locations includes determining where said set of positions are in said second video image; and said step of enhancing includes adding said virtual advertisement into said second video image where said set of positions are in said second video image.

47. An apparatus according to claim 39, further comprising:

camera sensors;

a gatherer computer, said gatherer computer receives camera sensor data from said camera sensors;

a time code inserter, said time code inserter receives video and adds time codes to said video; and a touch screen, said one or more processing devices include a first processor and a second processor, said first processor receives camera sensor data from said gatherer and video from said time code inserter, said first processor also receives annotation data from said touch screen, said annotation data relates to a set of positions on said touch screen, said one or more positions in said image of said actual surface being identified from said annotation data, said first processor converts said positions on said touch screen to said one or more locations in relation to said virtual surface, said first processor sends drawing information to said second processor, said drawing information is based on said one or more positions in said second video image, said second processor directs said video modification hardware to add one or more annotation image to said second video image, said annotation image corresponds to said annotation data, said step of converting said one or more locations is based on said camera sensor data.

48. An apparatus according to claim 39, further comprising:

camera sensors, said camera sensors provide camera sensor data to said one or more processors, said step of converting said one or more locations is based on said camera sensor data.

49. An apparatus according to claim 39, wherein said step of defining a virtual surface at a desired position with respect to a camera includes:

representing said virtual surface in a three-dimensional coordinate system for said camera;

selecting a reference point for said virtual surface relative to said camera; and positioning said virtual surface close to a portion of an environment to be enhanced in an image from said camera.

50. An apparatus according to claim 39, wherein said step of defining a virtual surface at a desired position with respect to a camera includes:

selecting at least one dimension of said virtual surface, relative to said camera, such that at least a portion of said virtual surface is positioned close to a portion of an environment to be enhanced in an image from said camera.

51. A method for enhancing video, comprising:

defining a virtual surface in a three-dimensional coordinate system for a camera, said defining includes selecting at least one dimension of said virtual surface, relative to said camera, such that at a least a portion of said virtual surface is positioned close to a portion of an environment to be enhanced in an image from said camera;

receiving an identification of one or more positions in a first image, wherein said first image depicts said environment;

converting said one or more positions to one or more locations in relation to said virtual surface;

converting said one or more locations to one or more positions in a second image, wherein said second image depicts said environment; and enhancing said second image based on said one or more positions in said second image.

52. A method according to claim 51, wherein enhancing said second image includes adding an enhancement image to said second image, wherein said enhancement image is positioned in said second image based on said one or more positions in said second image.

53. A method according to claim 52, wherein said enhancement image appears to be located at said portion of said environment.

54. A method according to claim 52, wherein said enhancement image is a virtual advertisement.

55. A method according to claim 51, wherein said environment includes an actual surface, said virtual surface is not an approximation of said actual surface or said environment.

56. A method according to claim 51, wherein said environment includes an actual surface, said virtual surface is of a different shape than said actual surface.

57. A method according to claim 51, wherein:
said one or more positions in said first image are two-dimensional positions;
said one or more locations in relation to said virtual surface are three-dimensional locations; and
said one or more positions in said second image are two-dimensional positions.

58. An apparatus according to claim 51, wherein:
said virtual surface is a sphere; and
said at least one dimension of said sphere includes a radius of said sphere.

* * * * *